(12) United States Patent
Ugawa et al.

(10) Patent No.: US 7,929,229 B2
(45) Date of Patent: Apr. 19, 2011

(54) PIEZOELECTRIC ACTUATOR DEVICE, IMAGE PICKUP UNIT AND MOBILE TERMINAL APPARATUS

(75) Inventors: Kouji Ugawa, Kanagawa (JP); Hiroshi Nishizawa, Kanagawa (JP); Tatsuo Kobayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 253 days.

(21) Appl. No.: 12/160,632

(22) PCT Filed: Feb. 28, 2007

(86) PCT No.: PCT/JP2007/053815
§ 371 (c)(1),
(2), (4) Date: Jul. 11, 2008

(87) PCT Pub. No.: WO2007/116619
PCT Pub. Date: Oct. 18, 2007

(65) Prior Publication Data
US 2010/0220404 A1    Sep. 2, 2010

(30) Foreign Application Priority Data

| Apr. 10, 2006 | (JP) | P. 2006-107653 |
| Apr. 10, 2006 | (JP) | P. 2006-107654 |
| Apr. 28, 2006 | (JP) | P. 2006-125042 |

(51) Int. Cl.
*G02B 7/02*    (2006.01)

(52) U.S. Cl. .......... 359/824; 359/694; 359/696; 359/822
(58) Field of Classification Search .................. 359/824
See application file for complete search history.

(56) References Cited

U.S. PATENT DOCUMENTS

| 5,490,015 A * | 2/1996 | Umeyama et al. ............. 359/824 |
| 2003/0133247 A1 * | 7/2003 | Ajioka ............................ 361/211 |
| 2006/0221472 A1 * | 10/2006 | Manabe et al. ................ 359/824 |
| 2007/0075610 A1 * | 4/2007 | Manabe et al. ................ 310/348 |

FOREIGN PATENT DOCUMENTS

| JP | 3-289373 | 12/1991 |
| JP | 2002-131611 | 5/2002 |
| JP | 2002-218773 | 8/2002 |
| JP | 2006-129625 | 5/2006 |
| JP | 2007-104761 | 4/2007 |

* cited by examiner

*Primary Examiner* — Jessica T Stultz
(74) *Attorney, Agent, or Firm* — McDermott Will & Emery LLP

(57) ABSTRACT

An actuator device includes: a piezoelectric element; a weight secured to one end of the piezoelectric element along an expansion-contraction direction thereof; and a drive member secured to another end of the piezoelectric element. The piezoelectric element and the weight are in contact so as to have a spatial overlap with respect to the expansion-contraction direction of the piezoelectric element, and the center of gravity of the weight is positioned in the vicinity of a plane that contains a contact plane in which the piezoelectric element and the weight are in contact.

29 Claims, 11 Drawing Sheets

FIG. 5A
FIG. 5B
PRIOR ART
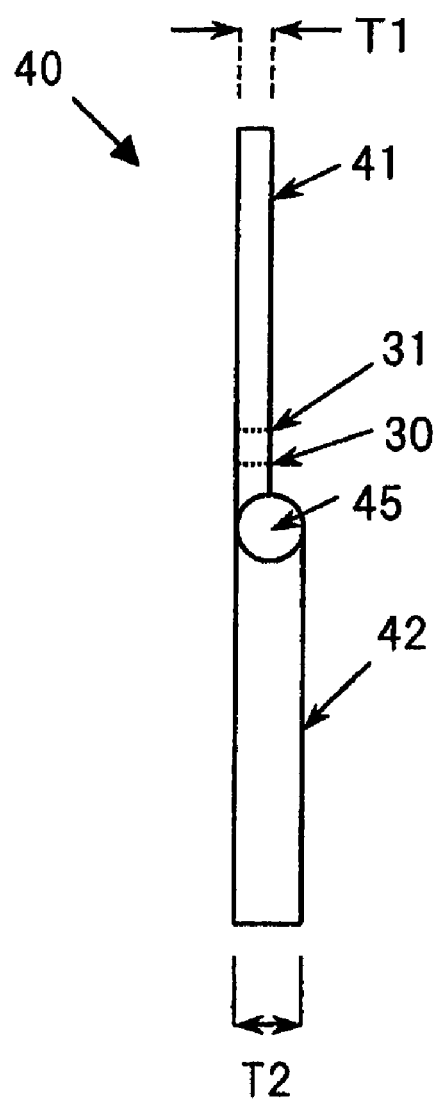
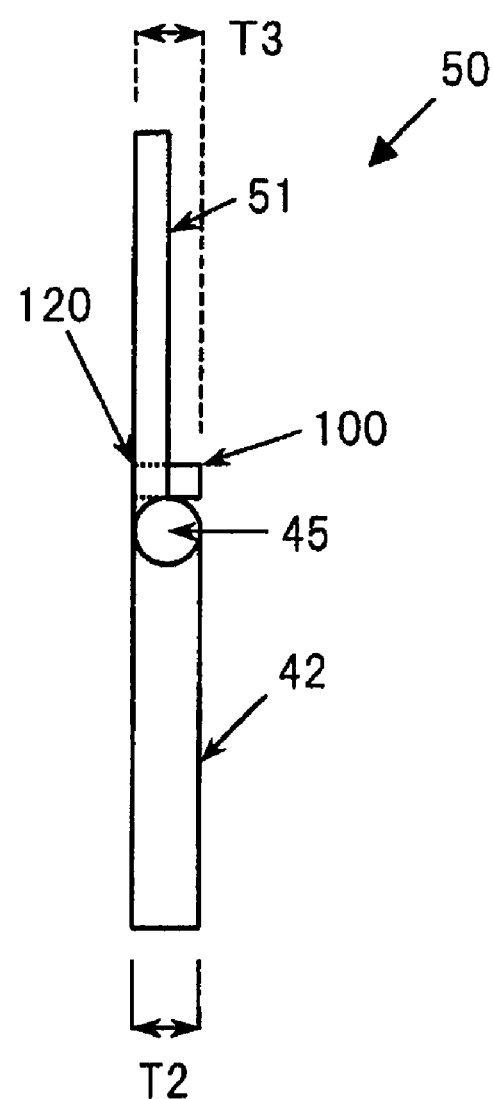

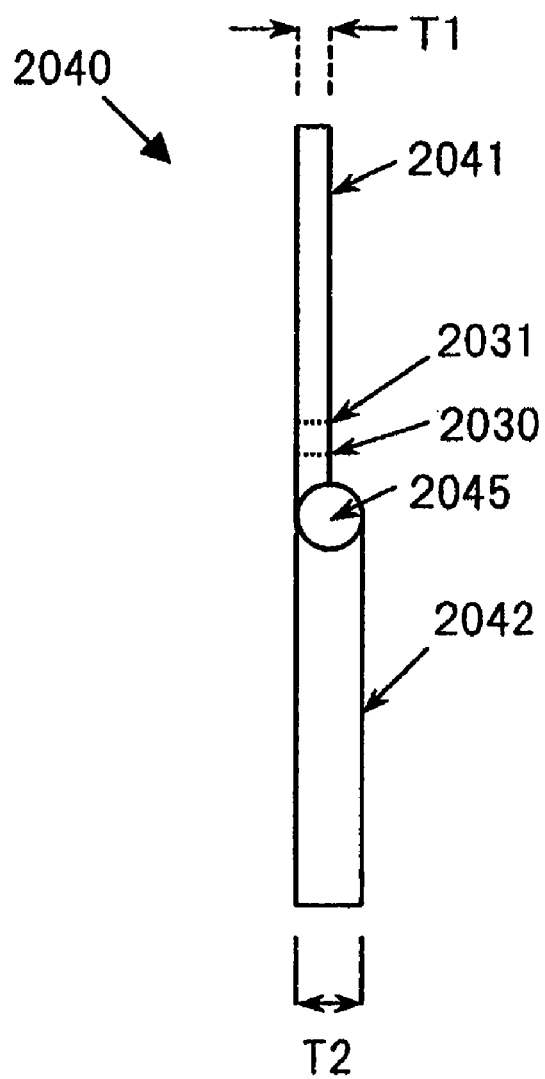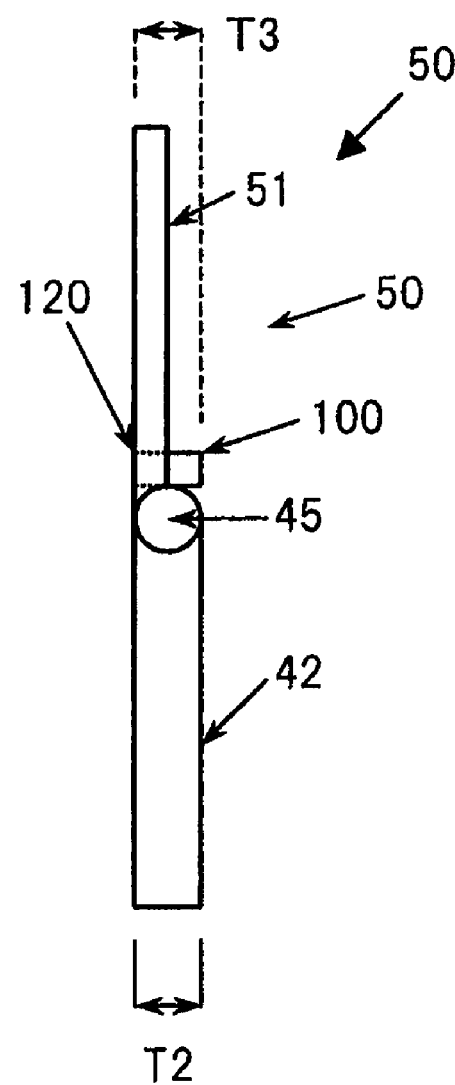
FIG. 15A
FIG. 15B
PRIOR ART

PIEZOELECTRIC ACTUATOR DEVICE, IMAGE PICKUP UNIT AND MOBILE TERMINAL APPARATUS

RELATED APPLICATIONS

This application is the U.S. National Phase under 35 U.S.C. §371 of International Application No. PCT/JP2007/053815, filed on Feb. 28, 2007, which in turn claims the benefit of Japanese Application No. 2006-107653, filed on Apr. 10, 2006, Japanese Application No. 2006-107654, filed on Apr. 10, 2006, and Japanese Application No. 2006-125042, filed on Apr. 28, 2006, the disclosures of which Applications are incorporated by reference herein.

TECHNICAL FIELD

The present invention relates to an actuator device employing an electromechanical transducer element such as a piezoelectric element. The invention also relates to an image pickup unit equipped with the actuator device, such as cameras, and further to a mobile terminal equipped with the image pickup unit.

BACKGROUND ART

An example of conventional actuator device that employs a piezoelectric element is described in Patent Document 1. The actuator device described in Patent Document 1 is provided with two lens groups in a zoom lens and respective driving means for driving them so as to effectively make use of the optical axis direction region that is required for mutual movement of the lens groups, the region not having been made use of.

This configuration makes it possible to reduce the size of the lens drive mechanism along the optical axis directions. Specifically, it is described that, by disposing the two drive means for the lens groups opposite to each other so as to overlap in the optical axis direction, further size reduction of the lens drive mechanism becomes possible (see Patent Document 1).

Patent Document 2 describes an actuator device for abruptly expanding and contracting a piezoelectric element by supplying sawtooth wave drive voltage to the piezoelectric element.

FIG. 16 illustrates a schematic structural view of one example of the actuator device that uses a piezoelectric element. An actuator device 100 as illustrated in FIG. 16 has a piezoelectric element 103, a weight 102 provided on one end of the piezoelectric element 103, and a drive shaft 104 provided on the other end of the piezoelectric element 103. These materials are adhesive-bonded to one another by an adhesive or the like.

The drive shaft 104 is provided with an engaging member (moving member) such as to catch and hold the shaft from both sides of the shaft. Here, the engaging member comprises a slider 107, a holder 105, and a spring 106 as an urging means for causing the slider 107 and the holder 105 to friction-engage with the drive shaft.

The piezoelectric element 103 is constructed by stacking (piling up) piezoelectric elements of lead zirconate titanate (hereinafter "PZT"). An example of PZT is a sheet-shaped one having a thickness of about 50 [μm] and a diameter Φ of 1.8 [mm]. An electrode of silver, palladium, or the like is provided for imparting an electric field to both sides thereof. When 60 layers of this sheet are stacked, the total thickness becomes about 3.5 [mm].

The weight 102 is made of a metal having a diameter Φ 3 [mm] and a length of 1 [mm], such as tungsten, which has a high density. The drive shaft 104 is made of long carbon fibers having a diameter Φ of 1 [mm] and a length of 4 [mm] that are aligned in an axis direction and fixed by an epoxy resin as a binder.

The weight 2 configured in this way has a substantially symmetrical shape, as illustrated in FIG. 16, and its center of gravity G2 lies at its center part. The drive shaft 104 also has a substantially symmetrical shape and its center of gravity G1 lies at its center part.

By supplying a sawtooth wave drive voltage to this piezoelectric element 103, the drive shaft attached to the piezoelectric element expands and contracts violently, and the moving member friction-retained to the drive shaft repeats "sliding" and "non-sliding" and becomes movable (see Patent Document 2).

Patent Document 1: JP-A-2002-131611 (pp. 3-4, FIG. 6)
Patent Document 2: JP-A-2002-218773 (pp. 3-4, FIGS. 1 and 3)

As an application example of the actuator device 100, FIG. 17 shows a schematic structural view of an image pickup unit 120 that employs the actuator device 100. As illustrated in FIG. 17, the image pickup unit 120 has an aspherical lens 121, an optical filter 123, and a semiconductor image pickup element 124, which are disposed along the optical axis in a housing 125. The lens 121 is retained by a lens-barrel 122, and an engaging member 127 that engages with the drive shaft 104 of the actuator device 100 is provided in a portion of the lens-barrel 122.

The lens-barrel 122 is allowed to be movable by the actuator device 100, in which the drive shaft 104 is disposed parallel to the optical axis. This permits the lens-barrel 122 to move in the optical axis direction so that the subject can be focused on the image pickup plane of the image pickup element 124 precisely with respect to the distance to the subject.

DISCLOSURE OF THE INVENTION

Problems that the Invention is to Solve

In the actuator device employing a piezoelectric element as shown in FIG. 16, a force acts onto the center of gravity G2 of the weight 102 when an impact force is applied from the outside of the actuator device because of dropping, for example, and a moment is produced at the adhesive-bonded surface between the weight and one end of the piezoelectric element 103. This moment works as a shear stress in the adhesive-bonded surface. Therefore, the shear stress can become greater when the impact force is great or when the distance between the center of gravity and the adhesive-bond is great. This may results in a fracture of the adhesive portion, which can be a cause of failure or noise.

Moreover, the above-described actuator device has an arrangement in which the drive shaft, the piezoelectric element, and the weight are disposed linearly along the expansion-contraction direction of the piezoelectric element, and the drive shaft requires the distance for the length of the engaging member that is friction-retained, in addition to the distance necessary for its movement. Consequently, the overall length of the actuator device becomes inevitably long. When the conventional actuator device is used for an auto-focusing mechanism or a zoom mechanism in which the lens of the image pickup unit is moved, it may be necessary to form a protruding part in a portion of the housing, as in the case of the portion C of the image pickup unit 120 shown in FIG. 17, in order to ensure a sufficient moving distance. This has been an obstacle to thickness reduction in the device.

In addition, likewise, a force acts onto the center of gravity G2 of the weight 102 when an impact force is applied from the outside of the actuator device because of dropping, for example, and a moment is produced at the adhesive-bonded surface between the weight and one end of the piezoelectric element 103. This moment works as a shear stress in the adhesive-bonded surface. Therefore, the shear stress can become greater when the impact force is great or when the distance between the center of gravity and the adhesive-bond is great. This may results in a fracture of the adhesive portion, which can be a cause of failure or noise.

In the actuator device employing a piezoelectric element as shown in FIG. 16, the drive member, the piezoelectric element, and the weight are disposed linearly in an expansion-contraction direction of the piezoelectric element. The drive member requires that the length of the engaging member that is friction-retained should be ensured in addition to the distance necessary for its movement, so the overall length becomes inevitably long. Therefore, when the piezoelectric actuator device is applied to an auto-focusing mechanism or a zoom mechanism, in which the lens moves, the device requires a length obtained by adding the length of the engaging member to the distance necessary for the movement in the optical axis direction, as in the case of the portion C of the image pickup unit 120 shown in FIG. 17. This has been an obstacle to size reduction and thickness reduction of the device or apparatus that incorporates the piezoelectric actuator device.

The invention has been accomplished the foregoing circumstances, and an object of the invention is provide an actuator device that realizes improvements in impact resistance as well as size reduction and thickness reduction of the device or apparatus.

Means for Solving the Problems

Accordingly, an actuator device according to the invention comprises: a piezoelectric element; a weight secured to one end of the piezoelectric element along an expansion-contraction direction thereof; and a drive member secured to another end of the piezoelectric element, wherein the piezoelectric element and the weight are in contact so as to have a spatial overlap with respect to the expansion-contraction direction of the piezoelectric element, and the center of gravity of the weight is positioned in the vicinity of a plane that contains a contact plane in which the piezoelectric element and the weight are in contact.

This configuration allows the center of gravity of the weight to be positioned in the vicinity of the one end of the piezoelectric element. Therefore, even when an impact force is applied to the actuator device from outside, almost no moment is produced and the shear stress at the adhesive-bonded surface between the piezoelectric element and the weight can be reduced. As a result, even when a great impact force is applied to the actuator device, it is possible to prevent a fracture from occurring at the end portions of the weight and the piezoelectric element. Moreover, the piezoelectric element and the weight have an overlap. Therefore, the total longitudinal size of the piezoelectric element and the weight can be shortened, and the overall actuator device can be made smaller.

Alternatively, the actuator device according to the invention is one that comprises: a piezoelectric element having a recessed part; a weight having a flat part secured to one end of the piezoelectric element along an expansion-contraction direction thereof, and a protruding part accommodated in the recessed part of the piezoelectric element; and a drive member secured to another end of the piezoelectric element, wherein the center of gravity of the weight is positioned in the vicinity of a plane that contains a contact plane in which the piezoelectric element and the weight are in contact.

This configuration allows the center of gravity of the weight to be positioned in the vicinity of the one end of the piezoelectric element. Therefore, even when an impact force is applied to the actuator device from outside, almost no moment is produced and the shear stress in the flat part that is the adhesive-bonded surface between the piezoelectric element and the weight can be reduced. As a result, even when a great impact force is applied to the actuator device, it is possible to prevent a fracture from occurring at the end portions of the weight and the piezoelectric element. Moreover, the protruding part of the weight is accommodated in the recessed part of the piezoelectric element. Therefore, the total longitudinal size of the piezoelectric element and the weight can be shortened, and the overall actuator device can be made smaller.

Alternatively, the actuator device according to the invention is one that comprises: a piezoelectric element; a weight having a recessed part for accommodating a portion of the piezoelectric element, the weight secured to one end of the piezoelectric element along an expansion-contraction direction thereof at a bottom face of the recessed part; and a drive member secured to another end of the piezoelectric element, wherein the center of gravity of the weight is positioned in the vicinity of a plane that contains a contact plane in which the piezoelectric element and the weight are in contact.

This configuration enables the fabrication of the weight to be performed with almost no change in the degree of difficulty associated with the processing because the fabrication of the weight is generally done by die-cast or machining with a lathe. Therefore, the fabrication of the piezoelectric element becomes easy. Moreover, the weight covers an outside shape of the piezoelectric element and therefore can protect the piezoelectric element. That is, this configuration has an advantage that the piezoelectric element can be prevented from being damaged, for example, during handling. In addition, similar to the foregoing invention, this configuration allows the center of gravity of the weight to be positioned in the vicinity of the one end of the piezoelectric element. Therefore, even when an impact force is applied to the actuator device from outside, almost no moment is produced and the shear stress at the adhesive-bonded surface between the piezoelectric element and the weight can be reduced. As a result, even when a great impact force is applied to the actuator device, it is possible to prevent a fracture from occurring at the end portions of the weight and the piezoelectric element. Moreover, the piezoelectric element and the weight have an overlap. Therefore, the total longitudinal size of the piezoelectric element and the weight can be shortened, and the overall actuator device can be made smaller.

In the actuator device according to the invention, the piezoelectric element and the weight may be disposed substantially coaxially with each other.

This configuration makes it possible to reduce the moment produced in the weight by the contraction of the piezoelectric element and makes the rotational motion that has a component orthogonal to the expansion-contraction direction of the piezoelectric element less likely to occur. Therefore, generation of noise can be prevented without reducing the efficiency.

In addition, an image pickup unit according to the invention comprises: an actuator device comprising a piezoelectric element, a weight secured to one end of the piezoelectric element along an expansion-contraction direction thereof, and a drive member secured to another end of the piezoelectric element, wherein the piezoelectric element and the weight are in contact so as to have a spatial overlap with respect to the expansion-contraction direction of the piezoelectric element and the center of gravity of the weight is positioned in the vicinity of a plane that contains a contact plane in which the piezoelectric element and the weight are in contact; an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

Generally, in an image pickup unit that has a moving part in the optical system, the thickness of the image pickup unit is greatly dependent on the part that moves in an optical axis direction in the optical system, not on the optical path length of the optical system; however, this configuration makes it possible to shorten the length of that part and to achieve thickness reduction of the image pickup unit. Moreover, the position of the center of gravity of the weight is nearly in the same plane as the plane in which the weight is secured to the piezoelectric element. Therefore, the production of moment due to an impact force applied from outside can be reduced, and thus, the impact resistance performance can be improved.

The image pickup unit according to the invention may be one in which an imaging magnification of the image pickup element for the image pickup plane is varied by movement of the lens-barrel for retaining the lens in an optical axis direction.

This configuration allows the size of the scaling mechanism part to be made short. Therefore, it becomes possible to reduce the size of the image pickup unit that has a zoom lens. In addition, in zoom lenses, the degree of freedom in designing tends to be lower because a plurality of groups of lenses need to be moved independently. However, this configuration allows the size of the scaling mechanism part to be shortened, and therefore makes it possible to enhance the degree of freedom in designing, including the arrangement.

In addition, a mobile terminal apparatus according to the invention comprises the above described image pickup unit.

This configuration improves the impact resistance performance of the mobile terminal apparatus. Specifically, the piezoelectric element and the weight are disposed so as to have an overlap with respect to the expansion-contraction direction of the piezoelectric element, and therefore, the moment due to the impact force applied to respective boundary surfaces is reduced even if a dropping impact or the like is applied to the mobile terminal apparatus because the length of the portion of the image pickup unit in which the lens moves is shortened. Thus, the impact resistance performance of the mobile terminal apparatus can improve, and the reliability increases.

Alternatively, the actuator device according to the invention is one that comprises: a piezoelectric element; a weight secured to one end of the piezoelectric element along an expansion-contraction direction thereof; and a drive member secured to another end of the piezoelectric element, wherein the drive member and the piezoelectric element are in contact so as to have a spatial overlap with respect to the expansion-contraction direction of the piezoelectric element.

In this configuration, the piezoelectric element and the drive member have an overlap. Therefore, the total longitudinal size of the piezoelectric element and the weight can be shortened, and the overall actuator device can be made smaller.

Alternatively, the actuator device according to the invention is one that comprises: a piezoelectric element; a weight secured to one end of the piezoelectric element along an expansion-contraction direction thereof; and a drive member secured to another end of the piezoelectric element, wherein the drive member has a recessed part for accommodating at least a portion of the piezoelectric element with respect to the expansion-contraction direction of the piezoelectric element.

In this configuration, a portion of the piezoelectric element is accommodated in the recessed part of the piezoelectric element. Therefore, the total longitudinal size of the piezoelectric element and the weight can be shortened, and the overall actuator device can be made smaller.

The actuator device according to the invention may be one in which the center of gravity of the drive member is positioned in the vicinity of a plane that contains a contact plane in which the piezoelectric element and the weight are in contact.

This configuration allows the center of gravity of the drive member to be positioned in the vicinity of the joint plane with the piezoelectric element. Therefore, even when an impact force is applied to the actuator device from outside, almost no moment is produced and the shear stress at the adhesive-bonded surface between the piezoelectric element and the drive member can be reduced. As a result, even when a great impact force is applied to the actuator device, it is possible to prevent a fracture from occurring at the end portions of the drive member and the piezoelectric element.

The actuator device according to the invention may be one in which the piezoelectric element and the weight are in contact so as to have a spatial overlap with respect to the expansion-contraction direction of the piezoelectric element.

In this configuration, the piezoelectric element and the weight have an overlap. Therefore, the total longitudinal size of the piezoelectric element and the weight can be shortened, and the overall actuator device can be made smaller.

The actuator device according to the invention may be one in which the weight has a recessed part for accommodating at least a portion of the piezoelectric element with respect to the expansion-contraction direction of the piezoelectric element.

In this configuration, a portion of the piezoelectric element is accommodated in the recessed part of the weight. Therefore, the total longitudinal size of the piezoelectric element and the weight can be shortened, and the overall actuator device can be made smaller. Moreover, this configuration enables the fabrication of the weight to be performed with almost no change in the degree of difficulty associated with the processing because the fabrication of the weight is generally done by die-cast or machining with a lathe. Moreover, the weight covers an outside shape of the piezoelectric element and therefore can protect the piezoelectric element. That is, this configuration has an advantage that the piezoelectric element can be prevented from being damaged, for example, during handling.

The actuator device according to the invention may be one in which the center of gravity of the weight is positioned in the vicinity of a plane that contains a contact plane in which the piezoelectric element and the weight are in contact.

This configuration allows the center of gravity of the weight to be positioned in the vicinity of the joint plane with the piezoelectric element. Therefore, even when an impact force is applied to the actuator device from outside, almost no moment is produced and the shear stress at the adhesive-bonded surface between the piezoelectric element and the weight can be reduced. As a result, even when a great impact force is applied to the actuator device, it is possible to prevent a fracture from occurring at the end portions of the weight and the piezoelectric element.

In the actuator device according to the invention, the drive member, the piezoelectric element, and the weight may be disposed substantially coaxially with each other.

This configuration makes it possible to reduce the moment produced in the weight by the contraction of the piezoelectric element and makes the rotational motion that has a component orthogonal to the expansion-contraction direction of the piezoelectric element less likely to occur. Therefore, generation of noise can be prevented without reducing the efficiency.

In addition, the image pickup unit according to the invention may be one that comprises: an actuator device comprising a piezoelectric element, a weight secured to one end of the piezoelectric element along an expansion-contraction direction thereof, and a drive member secured to another end of the piezoelectric element, wherein the drive member and the weight are in contact so as to have a spatial overlap with respect to the expansion-contraction direction of the piezoelectric element; an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

Alternatively, in the above described actuator device, the center of gravity of the drive member is positioned in the vicinity of a plane that contains a contact plane in which the piezoelectric element and the weight are in contact.

Generally, in an image pickup unit that has a moving part in the optical system, the thickness of the image pickup unit is greatly dependent on the part that moves in an optical axis direction in the optical system, not on the optical path length of the optical system; however, this configuration makes it possible to shorten the length of that part and to achieve thickness reduction of the image pickup unit. Moreover, the position of the center of gravity of the weight is nearly in the same plane as the plane in which the drive member is secured to the piezoelectric element. Therefore, the production of moment due to an impact force applied from outside can be reduced, and thus, the impact resistance performance can be improved.

The image pickup unit according to the invention may be one in which an imaging magnification of the image pickup element for the image pickup plane may be varied by movement of the lens-barrel for retaining the lens in an optical axis direction.

This configuration allows the size of the scaling mechanism part to be made short. Therefore, it becomes possible to reduce the size of the image pickup unit that has a zoom lens. In addition, in zoom lenses, the degree of freedom in designing tends to be lower because a plurality of groups of lenses needs to be moved independently. However, this configuration allows the size of the scaling mechanism part to be shortened, and therefore makes it possible to enhance the degree of freedom in designing, including the arrangement.

In addition, a mobile terminal apparatus according to the invention comprises the above described image pickup unit.

This configuration improves the impact resistance performance of the mobile terminal apparatus. Specifically, the piezoelectric element and the weight are disposed so as to have an overlap with respect to the expansion-contraction direction of the piezoelectric element, and therefore, the moment due to the impact force applied to respective boundary surfaces is reduced even if a dropping impact or the like is applied to the mobile terminal apparatus because the length of the portion of the image pickup unit in which the lens moves is shortened. Thus, the impact resistance performance of the mobile terminal apparatus can improve, and the reliability increases.

Alternatively, the actuator device according to the invention is one that comprises: a piezoelectric element; a weight secured to one end of the piezoelectric element along an expansion-contraction direction thereof; and a drive member secured to another end of the piezoelectric element, wherein the piezoelectric element and the weight are in contact so as to have a spatial overlap with respect to the expansion-contraction direction of the piezoelectric element.

In this configuration, the piezoelectric element and the weight have an overlap. Therefore, the total longitudinal size of the piezoelectric element and the weight can be shortened, and the overall actuator device can be made smaller.

Alternatively, the actuator device according to the invention is one that comprises: a piezoelectric element having a recessed part; a weight having a flat part secured to one end of the piezoelectric element along an expansion-contraction direction thereof, and a protruding part accommodated in the recessed part of the piezoelectric element; and a drive member secured to another end of the piezoelectric element.

In this configuration, the protruding part of the weight is accommodated in the recessed part of the piezoelectric element. Therefore, the total longitudinal size of the piezoelectric element and the weight can be shortened, and the overall actuator device can be made smaller.

Alternatively, the actuator device according to the invention is one that comprises: a piezoelectric element; a weight having a recessed part for accommodating a portion of the piezoelectric element, the weight secured to one end of the piezoelectric element along an expansion-contraction direction thereof at a bottom face of the recessed part; and a drive member secured to another end of the piezoelectric element.

This configuration enables the fabrication of the weight to be performed with almost no change in the degree of difficulty associated with the processing because the fabrication of the weight is generally done by die-cast or machining with a lathe. Therefore, the fabrication of the piezoelectric element becomes easy. Moreover, the weight covers an outside shape of the piezoelectric element and therefore can protect the piezoelectric element. That is, this configuration has an advantage that the piezoelectric element can be prevented from being damaged, for example, during handling. Moreover, the piezoelectric element and the weight have an overlap. Therefore, the longitudinal size, in which the length of the piezoelectric element and the length of the weight are added, can be shortened, and the overall actuator device can be made smaller.

In the actuator device according to the invention, the piezoelectric element and the weight may be disposed substantially coaxially with each other.

This configuration makes it possible to reduce the moment produced in the weight by the contraction of the piezoelectric element and makes the rotational motion that has a component orthogonal to the expansion-contraction direction of the piezoelectric element less likely to occur. Therefore, generation of noise can be prevented without reducing the efficiency.

In addition, the image pickup unit according to the invention may be one that comprises: an actuator device comprising a piezoelectric element, a weight secured to one end of the piezoelectric element along an expansion-contraction direction thereof, and a drive member secured to another end of the piezoelectric element, wherein the piezoelectric element and the weight are in contact so as to have a spatial overlap with respect to the expansion-contraction direction of the piezoelectric element; an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

Generally, in an image pickup unit that has a moving part in the optical system, the thickness of the image pickup unit is greatly dependent on the part that moves in an optical axis direction in the optical system, not on the optical path length of the optical system; however, this configuration makes it possible to shorten the length of that part and to achieve thickness reduction of the image pickup unit.

The image pickup unit according to the invention may be, in addition to the above described configuration, one in which an imaging magnification of the image pickup element for the image pickup plane is varied by movement of the lens-barrel for retaining the lens in an optical axis direction.

This configuration allows the size of the scaling mechanism part to be made short. Therefore, it becomes possible to reduce the size of the image pickup unit that has a zoom lens. In addition, in zoom lenses, the degree of freedom in designing tends to be lower because a plurality of groups of lenses needs to be moved independently. However, this configuration allows the size of the scaling mechanism part to be shortened, and therefore makes it possible to enhance the degree of freedom in designing, including the arrangement.

In addition, a mobile terminal apparatus according to the invention may comprise the above described image pickup unit.

This configuration improves the impact resistance performance of the mobile terminal apparatus. Specifically, the piezoelectric element and the weight are disposed so as to have an overlap with respect to the expansion-contraction direction of the piezoelectric element, and therefore, the moment due to the impact force applied to respective boundary surfaces is reduced even if a dropping impact or the like is applied to the mobile terminal apparatus because the length of the portion of the image pickup unit in which the lens moves is shortened. Thus, the impact resistance performance of the mobile terminal apparatus can improve, and the reliability increases.

ADVANTAGES OF THE INVENTION

The actuator device according to the invention can achieve improvements in impact resistance as well as size reduction and thickness reduction of the device or apparatus.

BRIEF DESCRIPTION OF THE DRAWINGS

FIG. 5A is a side view of a mobile terminal apparatus 40 according to the fourth embodiment, and FIG. 5B is a side view of a conventional mobile terminal apparatus 50.

FIG. 15A is a side view of a mobile terminal apparatus 2040 according to the twelfth embodiment, and FIG. 15B is a side view of a conventional mobile terminal apparatus 2050.

Figure 1:
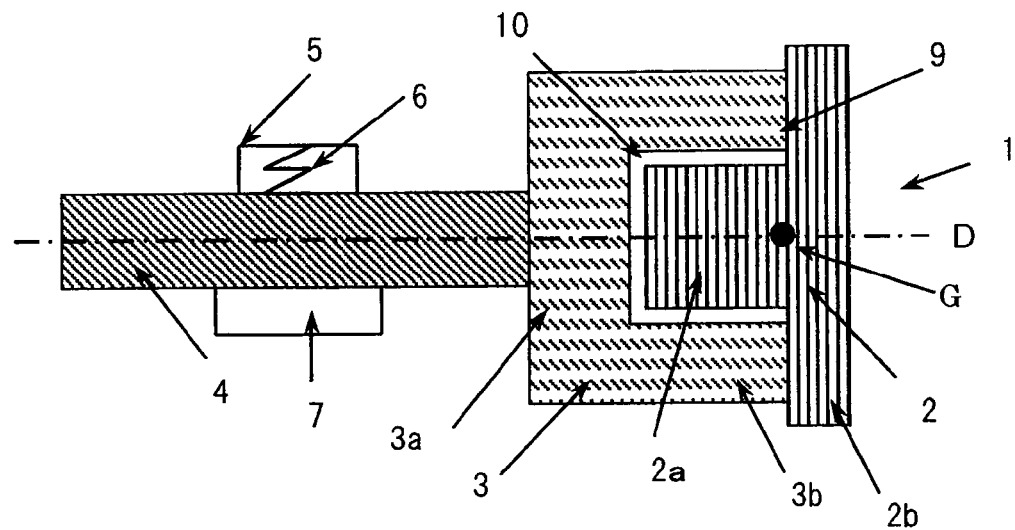
FIG. 1 is a cross-sectional view showing a primary part of an actuator device 1 according to a first embodiment.

DESCRIPTION OF THE REFERENCE NUMERALS AND SIGNS 1 actuator device
2 weight
3 piezoelectric element
4 drive shaft
5 holder
6 spring
7 slider
9 space
10 gap
21 actuator device
22 weight
23 piezoelectric element
27 engaging member
30 image pickup unit
31 actuator device
32 weight
33 piezoelectric element
34 optical filter
35 housing
36 semiconductor image pickup element
37 lens-barrel
38 aspherical lens
40 mobile telephone device
41 upper housing
42 lower housing
43 speaker
44 display screen
45 hinge
46 antenna
47 input key
48 microphone
51 upper housing 100 actuator device
102 weight
103 piezoelectric element
104 drive shaft
105 holder
106 spring
107 slider
120 image pickup unit
121 aspherical lens
122 lens-barrel
123 optical filter
124 semiconductor image pickup element
125 housing
127 engaging member
1001 actuator device
1002 weight
1003 piezoelectric element
1004 drive shaft
1005 holder
1006 spring
1007 slider
1021 actuator device
1022 weight
1023 piezoelectric element
1024 drive shaft
1027 engaging member
1030 image pickup unit
1031 actuator device
1032 weight
1033 piezoelectric element
1034 optical filter
1035 housing
1036 semiconductor image pickup element
1037 lens-barrel
1038 aspherical lens
1039 drive shaft
1040 mobile telephone device
1041 upper housing
1042 lower housing
1043 speaker
1044 display screen
1045 hinge
1046 antenna
1047 input key
1048 microphone
2001 actuator device
2002 weight
2002a weight
2002b weight
2003 piezoelectric element
2003a piezoelectric element
2003b piezoelectric element
2004 drive shaft
2005 holder
2006 spring
2007 slider
2009 space
2010 gap
2021 actuator device
2022 weight
2023 piezoelectric element
2027 engaging member
2030 image pickup unit
2031 actuator device
2032 weight
2033 piezoelectric element
2034 optical filter
2035 housing
2036 semiconductor image pickup element
2037 lens-barrel
2038 aspherical lens
2040 mobile telephone device
2041 upper housing
2042 lower housing
2043 speaker
2044 display screen
2045 hinge
2046 antenna
2047 input key
2048 microphone
A optical axis of lens
B moving axis of piezoelectric element

BEST MODE FOR CARRYING OUT THE INVENTION

Hereinbelow, embodiments of the present invention will be described with reference to the drawings.

First Embodiment

Hereinbelow, an actuator device according to this embodiment of the invention will be described with reference to the drawings. FIG. 1 is a cross-sectional view of a primary part of an actuator device 1 illustrating the first embodiment of the invention.

An actuator device 1 of the first embodiment shown in FIG. 1 has a piezoelectric element 3, a weight 2 provided on one end side of the piezoelectric element 3, and a drive shaft 4 provided on the other end side of the piezoelectric element 3, each of which is adhesive-bonded by adhesive (not shown).

The piezoelectric element 3 is constructed, for example, by stacking (piling up) piezoelectric elements of lead zirconate titanate (hereinafter "PZT"). The piezoelectric element 3 of the first embodiment comprises a portion 3a and a centrally hollow portion 3b that are constructed integrally. In the portion 3a, disk-shaped PZTs are stacked, and in the portion 3b, donut-shaped PZTs are stacked. In other words, the piezoelectric element 3 is in a shape that has a cylindrical space 9 with a certain depth.

The weight 2 provided on one end side of the piezoelectric element 3 is formed of a metal having a high density, such as tungsten, and formed in a stepped shape. A portion thereof with a smaller diameter is formed into a shape that can be inserted correspondingly in the space 9. The weight 2 is adhesive-bonded to the piezoelectric element 3 at a stepped part 2b having a larger diameter. In this case, it is necessary that a gap 10 is provided between the piezoelectric element 3 and the tip portion of the smaller diameter portion 2a of the weight 2.

This is to allow the weight 2 to be the one that is disposed on an end part of the piezoelectric element 3, and thereby, the weight 2 is made equivalent to the one in which a weight 2 is mechanically folded over. In addition, the piezoelectric element 3 and the weight 2 are disposed so as to be coaxial with each other. Specifically, for example, the stepped part 2b of the weight 2 was formed so that the diameter was Φ 3.5 [mm] and the length was 0.48 [mm], and the smaller diameter portion 2a was formed so that the diameter was Φ 1.8 [mm] and the length was 0.98 [mm]. The piezoelectric element 3 was formed so as to have an outer diameter of Φ 3.2 [mm] and a length of 1.5 [mm], and the space 9 was formed so as to have Φ 2 [mm] and a length of 1.0 [mm]

The drive shaft 4 was formed of long carbon fibers having a diameter of Φ 1.0 [mm] and a length of 4.0 [mm] that were aligned in an axis direction and fixed by an epoxy resin as a binder to improve abrasion resistance.

With this configuration, the center of gravity G of the weight 2 is positioned in the vicinity of the intersection point of the coaxial axis D and a contact plane in which the piezoelectric element 3 and the weight 2 are adhesive-bonded, as illustrated in FIG. 1.

The drive shaft 4 is provided with an engaging member such as to catch and hold the shaft from both sides of the shaft. Here, the engaging member comprises a slider 7, a holder 5, and a spring 6 as an urging means for causing the slider 7 and the holder 5 to friction-engage with the drive shaft.

Next, the operation of the actuator device 1 will be discussed. A drive voltage such as a sawtooth wave is applied to the piezoelectric element 3 to this actuator device 1 by a drive circuit comprising an H-bridge, which is not shown. As the drive voltage is increased, the piezoelectric element 3 is deformed in the expansion direction in FIG. 1 (toward the left in the figure). As the drive voltage is raised gradually, the piezoelectric element 3 extends slowly, and accordingly, the drive shaft 4 is slowly displaced toward the left.

The drive shaft 4 and the engaging member are displaced by static friction while they are kept engaged with each other in the same positional relationship. That is, as the voltage is raised gradually, the engaging member is displaced toward the left of the figure.

Next, when the drive voltage is abruptly changed in the opposite direction, the piezoelectric element 3 contracts abruptly, and accordingly, the drive shaft 4 is rapidly displaced toward the right. At this time, the engaging member overcomes the friction with the drive shaft 4 and stays unmoved at that place (according to the law of inertia). As a result, the engaging member moves toward the left relative to the drive shaft 4. By repeating this, the engaging part can be moved continuously.

Changing the moving direction can be realized by making the voltage application opposite or reversing the drive waveform. In the present embodiment, the drive circuit is an H-bridge as described above. This is convenient since the polarity of the applied voltage can be easily reversed. Although it is possible to change the voltage waveform, application method, and time interval of the applied voltage in many ways, it is important that they should be optimized from various characteristics such as efficiency, moving speed, and noise, depending on the actual system.

In this way, the actuator device 1 according to the first embodiment allows the engaging member to move. Moreover, even when an impact force is applied to the actuator device 1 from outside, almost no moment is produced and the shear stress at the adhesive-bonded surface between the piezoelectric element 3 and the weight 2 can be reduced, since the center of gravity G of the weight 2 is provided in the vicinity of one end of the piezoelectric element 3. As a result, even when a great impact force is applied to the actuator device 1, it is possible to prevent a fracture from occurring at the end portions of the weight 2 and the piezoelectric element 3. Furthermore, since the piezoelectric element 3 and the weight 2 are disposed so as to be coaxial with each other, it is possible to reduce unnecessary moment produced in the weight 2 due to expansion and contraction of the piezoelectric element 3. Thus, vibration and noise can be prevented from occurring.

What is more, the actuator device 1 of the first embodiment makes it possible to reduce the total longitudinal size of the piezoelectric element 3 and the weight 2, since the smaller diameter portion of the weight 2 has such a shape as to be inserted into the space 9 of the piezoelectric element 3 correspondingly, although the drive shaft 4 has the same shape. Specifically, the total longitudinal size of the piezoelectric element 3 and the weight 2 was reduced from 3 [mm] to about 2 [mm], which was a 1 [mm] reduction. As a result, the overall actuator device 1 can be made smaller, and the image pickup unit that employs the actuator device 1 can also be made smaller and thinner.

Although specific dimensions may be changed as appropriate by changing the shapes of the piezoelectric element and the weight, it is desirable that the volumes of the piezoelectric element and the weight should be nearly invariable before and after the change.

Second Embodiment

Figure 2A:
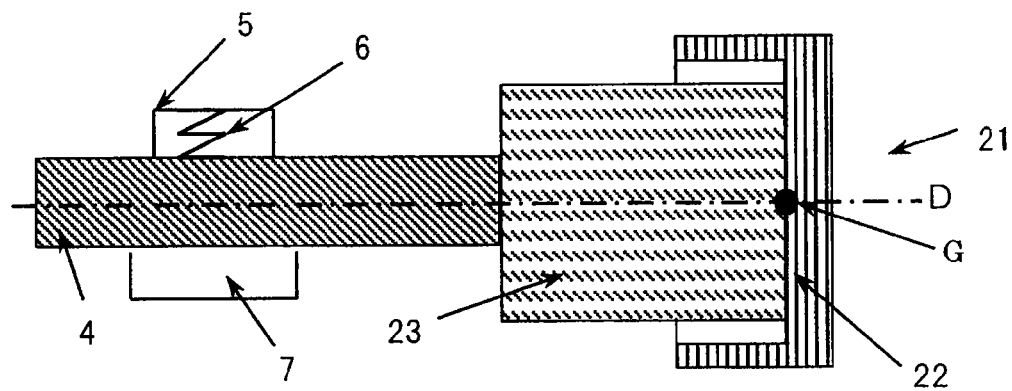
FIG. 2A is a cross-sectional view showing a primary part of an actuator device 21 according to a second embodiment.

FIG. 2A is a cross-sectional view of a primary part of an actuator device 21, which illustrates the second embodiment of the invention.

In the following description, the same parts as the parts described above are designated by the same reference numerals, and the explanations thereof are omitted.

An actuator device 21 according to the second embodiment of the invention will be described. A piezoelectric element 23 of the second embodiment has a cylindrical shape, which is similar to the conventional examples. On the other hand, a weight 22 is provided with a cylindrical space in its center part, and it is formed so that the piezoelectric element 23 can be accommodated therein. In addition, the piezoelectric element 23 and the weight 22 are adhesive-bonded together at a bottom face part of the cylindrical shape of the weight 22.

This configuration allows the center of gravity G of the weight 22 to be positioned in the vicinity of one end of the piezoelectric element 23. Therefore, even when an impact force is applied to the actuator device 1 from outside, almost no moment is produced and the shear stress in the adhesive-bonded surface between the piezoelectric element 3 and the weight 22 can be reduced. As a result, even when a great impact force is applied to the actuator device 21, it is possible to prevent a fracture from occurring at the end parts of the weight 22 and the piezoelectric element 23.

Moreover, the actuator device 21 is formed so that the piezoelectric element 23 can be accommodated in the cylindrical space provided at the center part of the weight 22; therefore, the total longitudinal size of the piezoelectric element 23 and the weight 22 can be shortened, and the overall actuator device 21 can also be made smaller.

Moreover, although the actuator device 21 according to the second embodiment necessitates a slightly more complicated shape of the weight than that of the actuator device 1 according to the first embodiment, the fabrication of the weight can be performed with almost no change in the degree of difficulty associated with the processing since the fabrication of the weight is generally done by die-cast or machining with a lathe. Therefore, the fabrication of the piezoelectric element is made more easily than with the first embodiment, in which two kinds of piezoelectric elements need to be prepared and stacked.

Furthermore, according to the configuration of the actuator device 21 of the second embodiment, the weight 22 covers an outside shape of the piezoelectric element 23, making it possible to protect the piezoelectric element. That is, this embodiment has an advantage that the piezoelectric element 23 can be prevented from being damaged, for example, during handling.

Figure 2B:
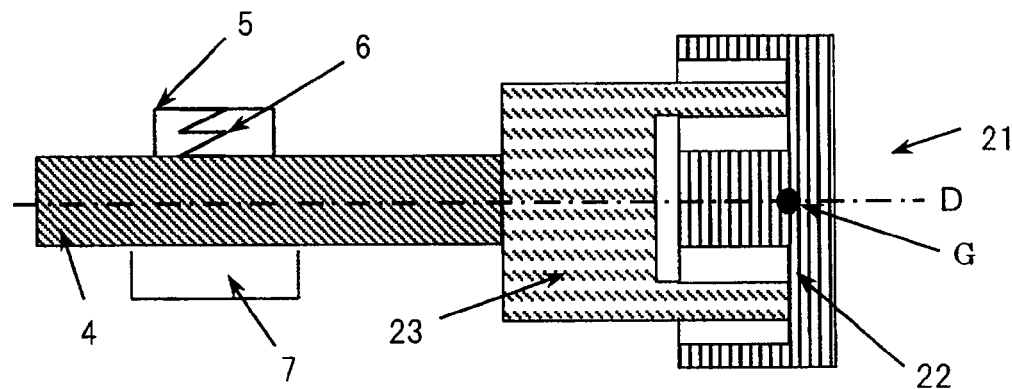
FIG. 2B is a cross-sectional view showing a primary part of a modification example of the actuator device.

Furthermore, as illustrated in FIG. 2B, it is also possible to use the first and the second embodiments in combination. This enhances the degree of freedom in designing. Moreover, the shape of the weight can be made relatively large; therefore, it is possible to replace the costly materials such as tungsten with less-costly materials, such as brass.

Third Embodiment

Figure 3:
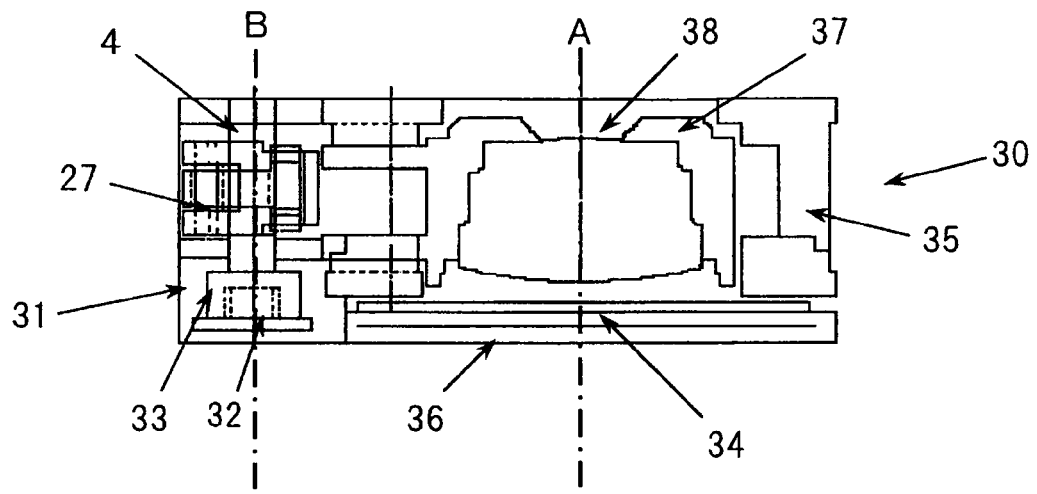
FIG. 3 is a cross-sectional view showing a primary part of an image pickup unit 30 according to a third embodiment.

An image pickup unit 30 according to the third embodiment will be described. FIG. 3 is a cross-sectional view showing a primary part of an image pickup unit 30 according to the third embodiment. In the following description, the same parts as the parts described above are designated by the same reference numerals, and the explanations thereof are omitted.

As illustrated in FIG. 3, the image pickup unit 30 has an aspherical lens 38, an optical filter 34, and a semiconductor image pickup element 35, which are disposed along the optical axis in a housing 36. The lens 38 is retained by a lens-barrel 37, and an engaging member 27 that engages with a drive shaft 4 of an actuator device 31 is provided in a portion of the lens-barrel 37.

The lens-barrel 37 is allowed to be movable by the actuator device 31, in which the drive shaft 4 is disposed parallel to the optical axis. The lens 38 is a lens having an aspheric shape (hereinafter referred to as a "lens"). Although only one lens is shown for brevity, the lens actually comprises two lenses. In order to focus a subject image precisely on the image pickup plane (not shown) of the image pickup element 36 with respect to the distance to the subject, the device has what is called an auto-focusing function, by which the lens-barrel 37 is moved along the optical axis direction.

As for the method for the auto-focusing, a known method is used, in which reading-out of an image is performed and the point at which the harmonic content of the read-out signal becomes the greatest.

For the actuator device 31, the actuator device according to the first or the second embodiment is used, and its operation is the same as described in the foregoing. Thus, this image pickup unit is an image pickup unit that adjusts what is called a back focus position from the lens 38 to the image plane by the actuator device 31.

The optical filter 34 is of a reflective type in which dielectric films having different refractive indices are stacked, which restricts transmission of the light other than the visible light region. The semiconductor image pickup element 36 is a CCD having about 130 million pixels and a ¼-inch diagonal screen, and its pixel size is about 2.8 [μm].

The image pickup unit 30 according to the third embodiment that is configured in this way employs the actuator device 31 according to the first or the second embodiment, and the actuator device 31 is configured so that the piezoelectric element 33 and the weight 32 have an overlap with respect to the axis direction of the drive shaft 4. Therefore, the overall length is shortened although the same drive shaft 4 is used.

As a result, even with the configuration in which the actuator device is arranged parallel to the optical axis, the thickness of the overall image pickup unit can be reduced. In addition, it will be clear that the overall length can be reduced even in the case where the actuator device 31 protrudes from the image pickup unit 30. In such an image pickup unit, it is advantageous to dispose the actuator device, which moves the optical system in optical axis directions when performing auto-focusing, parallel to the optical axis directions, in terms of efficiency and in terms of shape. However, it is also possible to dispose the actuator device perpendicular to the optical axis to apply an image pickup unit provided with a conversion mechanism by a cam or the like.

In addition, when the aspherical lens 38 disposed along the optical axis comprises a plurality of lens groups, it is also possible to change the relationship of the optical axis direction of the lens group and the relationship with the image pickup element 36. In this case, an image pickup unit using what is called a zoom lens that makes it possible to change the imaging magnitude to the image plane can be realized.

When the aspherical lens 38 comprises a plurality of lens group, a plurality of actuator devices is necessary since the movement is necessary for each lens group. Consequently, the axial size of the device becomes larger, and the thickness reduction becomes difficult. However, according to this embodiment, which uses an actuator device 31, thickness reduction can be achieved by, for example, increasing the overlap of the piezoelectric element and the weight along the optical axis directions for the actuator device for, of the lens groups, a lens having a moving distance longer than the others. It will be clear to those skilled in the art that the sizes and shapes thereof can be changed as appropriate.

Fourth Embodiment

Figure 4:
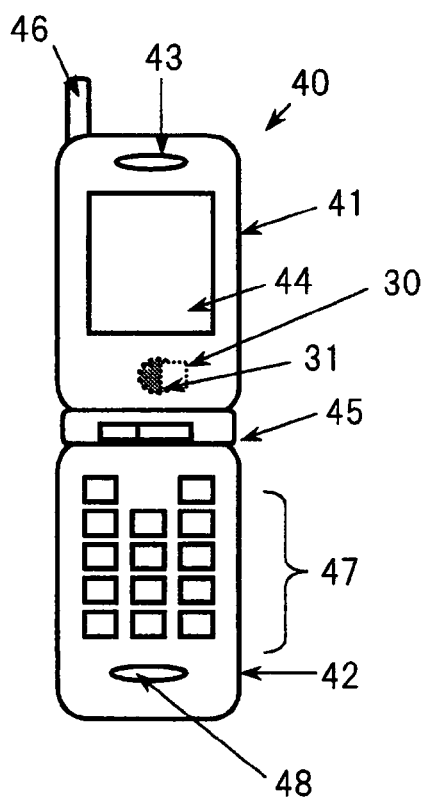
FIG. 4 is a front view of a mobile terminal apparatus 40 according to a fourth embodiment.

A mobile terminal apparatus 40 according to the fourth embodiment will be described. FIG. 4 is a front view of the mobile terminal apparatus 40 according to the fourth embodiment. FIG. 5A is a side view of the mobile terminal apparatus 40 according to the fourth embodiment. FIG. 5B is a side view of a conventional mobile terminal apparatus 50.

In the following description, the same parts as the parts described above are designated by the same reference numerals, and the explanations thereof are omitted.

As illustrated in FIG. 4, the mobile terminal apparatus 40 according to the fourth embodiment is a foldable-type mobile telephone. The mobile terminal apparatus 40 is configured so that an upper housing 41 and a lower housing 42 can be folded on top of each other via a hinge 45. The upper housing 41 comprises a liquid crystal display screen 44, a speaker 43, an antenna 46 for transmission and reception, an image pickup unit 30, and so forth. The lower housing 42 comprises input keys 47, a microphone 48, and so forth.

The image pickup unit 30 employs an image pickup unit according to the above-described third embodiment, which is equipped with an auto-focusing function. An actuator device 31 is disposed in a portion of the image pickup unit 30. The image pickup direction of the image pickup unit 30 is perpendicular to a plane that contains the display screen 44 in FIG. 4; in other words, the optical axis is the facing direction in the figure. The moving direction of the optical system by the auto-focusing is also in the facing direction.

The mobile terminal apparatus 40 has a configuration in which the upper housing 41 and the lower housing 42 are open when in use and are folded when not in use.

The mobile terminal apparatus 40 incorporates the image pickup unit 30 shown in the third embodiment, as mentioned above, and achieves improvements in thickness reduction. In the case of clamshell mobile terminal, the image pickup unit incorporated in the upper housing dominantly determines the thickness of the upper housing. As shown in FIG. 5A, the thickness of the upper housing 41 of the mobile terminal apparatus 40 according to the fourth embodiment is T1. On the other hand, the conventional mobile terminal apparatus 50 incorporates the image pickup unit 120 having the conventional actuator device 100, and therefore, the thickness of the upper housing 51 is T3, as shown in FIG. 5B.

Thus, the thicknesses are T1 and T3, respectively, due to the difference in thickness with respect to the optical axis direction of the actuator device 41 of the image pickup unit 30, and the relationship T1<T3 holds. In addition, even when the image pickup unit does not determine the thickness of the upper housing dominantly, a plenty of room in terms of the thickness direction can be provided within the upper housing 41. Therefore, it becomes possible to improve the degree of freedom in designing, such as arrangement of other components and addition of other components.

Furthermore, improvements in impact resistance value against dropping, for example, have been required for mobile telephones. By using the image pickup unit 30 according to the third embodiment, the center of gravity of the weight of the actuator device 31 is positioned near the end face of the piezoelectric element in which the piezoelectric element is adhesive-bonded. Therefore, fractures do not easily occur even with an impact force that is greater than conventionally applied. In other words, the moment due to an impact force or the like is reduced against the drop impact to the mobile terminal apparatus, and the impact moment is reduced. Therefore, the impact resistance performance can be improved, and reliability is enhanced.

The actuator devices and image pickup unit in the embodiments are not limited to these configurations, and are applicable to various types of mobile information devices. For example, it will be clear that the applications also include such mobile information devices as PDAs (Personal Digital Assistants), personal computers, and external devices for personal computers.

Fifth Embodiment

Figure 6:
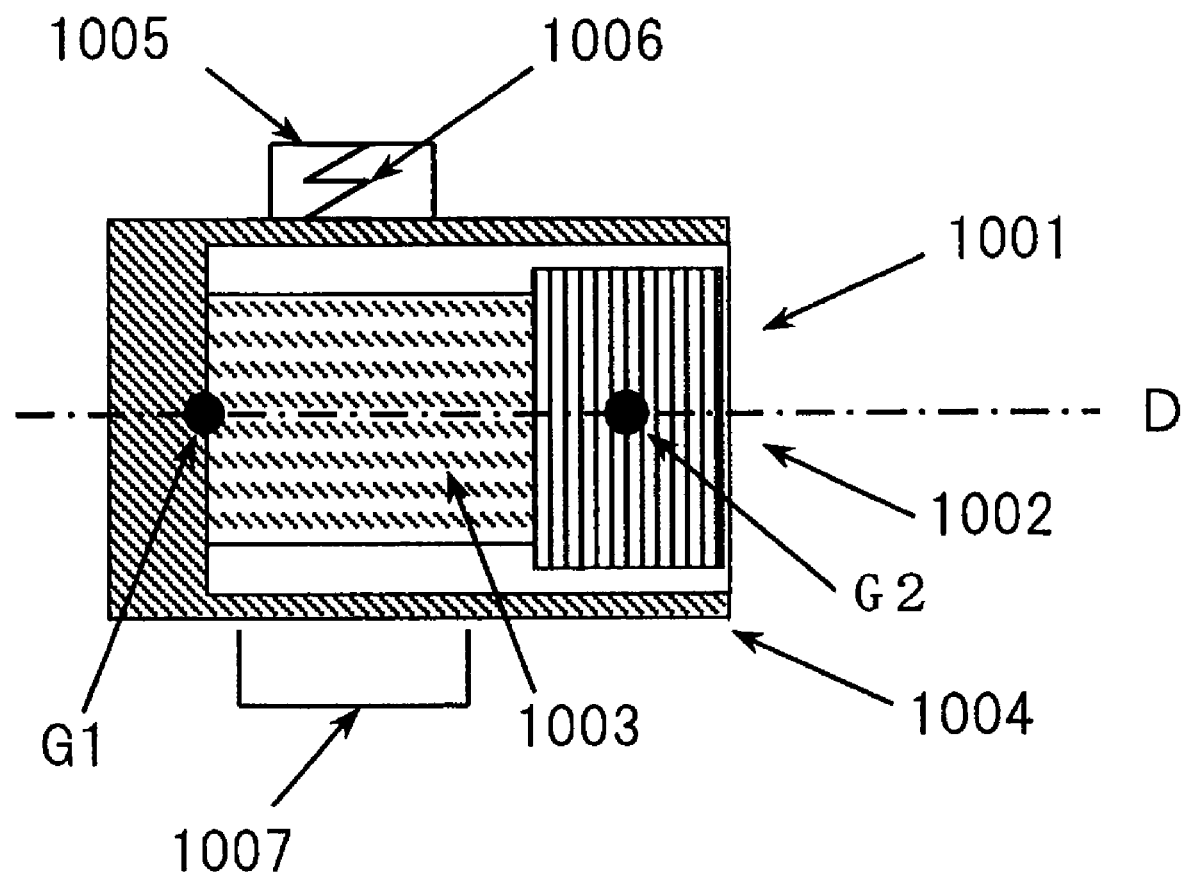
FIG. 6 is a cross-sectional view showing a primary part of an actuator device 1001 according to a fifth embodiment.

Hereinbelow, an actuator device according to this embodiment of the invention will be described with reference to the drawings. FIG. 6 is a cross-sectional view of a primary part of an actuator device 1001 illustrating the fifth embodiment of the invention.

An actuator device 1001 of the fifth embodiment shown in FIG. 6 has a piezoelectric element 1003, a weight 1002 provided on one end side of the piezoelectric element 1003, and a drive shaft 1004 provided on the other end side of the piezoelectric element 1003, each of which is adhesive-bonded by adhesive (not shown).

The piezoelectric element 1003 is constructed, for example, by stacking (piling up) piezoelectric elements of lead zirconate titanate (hereinafter "PZT"). A piezoelectric element 1003 of this embodiment employs the same one as used in the conventional examples.

The weight 1002 provided on one end side of the piezoelectric element 1003 is formed of a metal having a high density, such as tungsten. The diameter is made smaller and the length is made longer, in order to have the same mass as that of the conventional ones.

On the other hand, the drive shaft 1004 has a closed-bottomed cylindrical shape whose outer diameter is made larger. It is so formed as to accommodate, in other words, to contain, the piezoelectric element 1003 and the weight 1002 inside the cylindrical shape that the piezoelectric element 1003 and the weight 1002 have a spatial overlap. The drive shaft 1004 is adhesive-bonded to an end face that is on the opposite side of an end face in which the piezoelectric element 1003 is adhesive-bonded to the weight 1002, and it is mechanically folded over.

In addition, the drive shaft 1004, the piezoelectric element 1003, and the weight 1002 are disposed so as to be coaxial with each other. Specifically, for example, these components are formed as follows. The weight 1002 has an outer diameter of Φ 2 [mm] and a length of 2.25 [mm]. The piezoelectric element 1003 has an outer diameter of Φ 1.8 [mm] and a length of 3.5 [mm]. The drive shaft 1004 has an outer diameter of Φ 3.2 [mm] and a length of 7 [mm]. The tip portion of the drive shaft 1004 is formed so as to have an increased thickness, and as shown in FIG. 6, the center of gravity G1 of the drive shaft 1004 is positioned at a location that substantially matches the plane in contact with the piezoelectric element 1003. In addition, the center of gravity G2 of the weight 1002 is positioned in the vicinity of its center, like the conventional ones.

The drive shaft 1004 is provided with an engaging member such as to catch and hold the shaft from both sides of the shaft. Here, the engaging member comprises a slider 1007, a holder 1005, and a spring 1006 as an urging means for causing the slider 1007 and the holder 1005 to friction-engage with the drive shaft.

Next, the operation of the actuator device 1001 will be discussed. A drive voltage such as a sawtooth wave is applied to the piezoelectric element 1003 to this actuator device 1001 by a drive circuit comprising an H-bridge, which is not shown. As the drive voltage is increased, the piezoelectric element 1003 is deformed in the expansion direction in FIG. 6 (toward the left in the figure). As the drive voltage is raised gradually, the piezoelectric element 1003 extends slowly, and accordingly, the drive shaft 1004 is slowly displaced toward the left.

The drive shaft 1004 and the engaging member are displaced by static friction while they are kept engaged with each other in the same positional relationship. That is, as the voltage is raised gradually, the engaging member is displaced toward the left of the figure.

Next, when the drive voltage is abruptly changed in the opposite direction, the piezoelectric element 1003 contracts abruptly, and accordingly, the drive shaft 1004 is rapidly displaced toward the right. At this time, the engaging member overcomes the friction with the drive shaft 1004 and stays unmoved at that place (according to the law of inertia). As a result, the engaging member moves toward the left relative to the drive shaft 1004. By repeating this, the engaging part can be moved continuously.

Changing the moving direction can be realized by making the voltage application opposite or reversing the drive waveform. In the present embodiment, the drive circuit is an H-bridge as described above. This is convenient since the polarity of the applied voltage can be easily reversed. Although it is possible to change the voltage waveform, application method, and time interval of the applied voltage in many ways, it is important that they should be optimized from various characteristics such as efficiency, moving speed, and noise, depending on the actual system.

In this way, the actuator device 1001 according to the fifth embodiment allows the engaging member to move. Moreover, even when an impact force is applied to the actuator device 1001 from outside, almost no moment is produced and the shear stress at the adhesive-bonded surface between the piezoelectric element 1003 and the drive shaft 1004 can be reduced, since the center of gravity G of the drive shaft 1004 is provided in the vicinity of one end of the piezoelectric element 1003. As a result, even when a great impact force is applied to the actuator device 1001, it is possible to prevent a fracture from occurring at the end portions of the drive shaft 1004 and the piezoelectric element 1003. Furthermore, since the piezoelectric element 1003, the weight 1002, and the drive shaft 1004 are disposed so as to be coaxial with each other, it is possible to reduce unnecessary moment produced in the weight 1002 due to expansion and contraction of the piezoelectric element 1003. Thus, vibration and noise can be prevented from occurring.

What is more, the actuator device 1001 of the fifth embodiment makes it possible to reduce the total longitudinal size of the piezoelectric element 1003, the weight 1002, and the drive shaft 1004, because the piezoelectric element 1003 and the weight 1002 are accommodated inside the drive shaft 1004, although the piezoelectric element 1003 has substantially the same shape as that of the conventional ones. Specifically, the total longitudinal size of the actuator device 1001 was reduced from 8.5 [mm] to about 7.0 [mm], which was a 1.5 [mm] reduction. As a result, an image pickup unit or the like that employs the actuator device 1001 can also be made smaller and thinner.

Although specific dimensions may be changed as appropriate by changing the shapes of the piezoelectric element and the weight, it is desirable that the volumes of the piezoelectric element and the weight should be nearly invariable before and after the change.

Sixth Embodiment

Figure 7A:
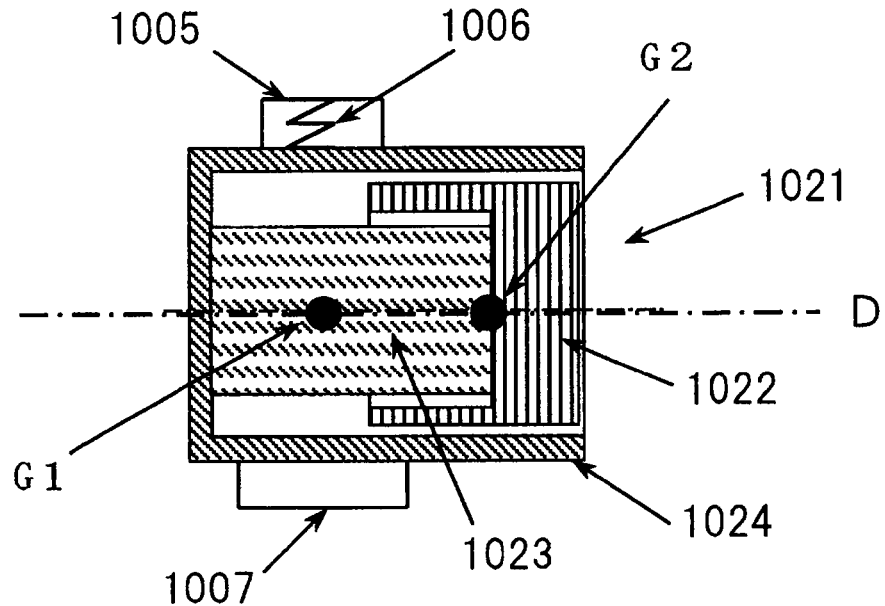
FIG. 7A is a cross-sectional view showing a primary part of an actuator device 1021 according to a sixth embodiment.

FIG. 7A is a cross-sectional view of a primary part of an actuator device 1021, which illustrates a sixth embodiment of the invention.

In the following description, the same parts as the parts described above are designated by the same reference numerals, and the explanations thereof are omitted.

An actuator device 1021 according to the sixth embodiment of the invention will be described. A weight 1022 has a recessed part with a size such as to accommodate a piezoelectric element 1023. That is, the inner diameter part of the weight 1022 is provided with a hole, and the piezoelectric element 1023 is inserted therein. In addition, the weight 1023 and the piezoelectric element 1023 and are disposed so as to be coaxial with each other. The hole diameter of the weight 1022 is made a slightly larger diameter than the outside shape of the piezoelectric element 1023. The piezoelectric element 1023 is adhesive-bonded in the bottom face of the recessed part of the weight 1022.

The drive shaft 1024 has a closed-bottomed cylindrical shape whose outer diameter is made larger. It is so formed as to accommodate, in other words, to contain, the piezoelectric element 1023 and the weight 1022 inside the cylindrical shape so that the piezoelectric element 1023 and the weight 1022 have a spatial overlap. The drive shaft 1024 is adhesive-bonded to an end face that is on the opposite side of an end face in which the piezoelectric element 1023 is adhesive-bonded to the weight 1022, and it is mechanically folded over.

The center of gravity G1 the drive shaft 1024 is, as shown in FIG. 7A, in the vicinity of the center part of the drive shaft 1024. The center of gravity G2 of the weight 1022 is positioned in the vicinity of the intersection point of the coaxial axis D and a plane that contains the contact end face with the piezoelectric element 1023.

This configuration allows the center of gravity G2 of the weight 1022 to be positioned in the vicinity of one end of the piezoelectric element 1023. Therefore, even when an impact force is applied to the actuator device 1021 from outside, almost no moment is produced and the shear stress in the adhesive-bonded surface between the piezoelectric element 1023 and the weight 1022 can be reduced. As a result, even when a great impact force is applied to the actuator device 1021, it is possible to prevent a fracture from occurring at the end parts of the weight 1022 and the piezoelectric element 1023.

Moreover, the actuator device 1021 is formed so that the piezoelectric element 1023 can be accommodated in the cylindrical space provided at the center part of the weight 1022; therefore, the total longitudinal size of the piezoelectric element 1023 and the weight 1022 can be shortened, and the overall actuator device 1021 can also be made smaller.

Moreover, although the actuator device 1021 according to the sixth embodiment necessitates a slightly more complicated shape of the weight than that of the actuator device 5 according to the first embodiment, the fabrication of the weight can be performed with almost no change in the degree of difficulty associated with the processing since the fabrication of the weight is generally done by die-cast or machining with a lathe.

Furthermore, according to the configuration of the actuator device 1021 of the sixth embodiment, the weight 1022 covers an outside shape of the piezoelectric element 1023, making it possible to protect the piezoelectric element. That is, this embodiment has an advantage that the piezoelectric element 1023 can be prevented from being damaged, for example, during handling.

Furthermore, the configuration has the advantages that the longitudinal size of the overall actuator device 1024 can be shortened and the piezoelectric element 1023 can be prevented from being damaged during handling or the like because the weight 1022 and the piezoelectric element 1023 are accommodated inside the drive shaft 1024.

Figure 7B:
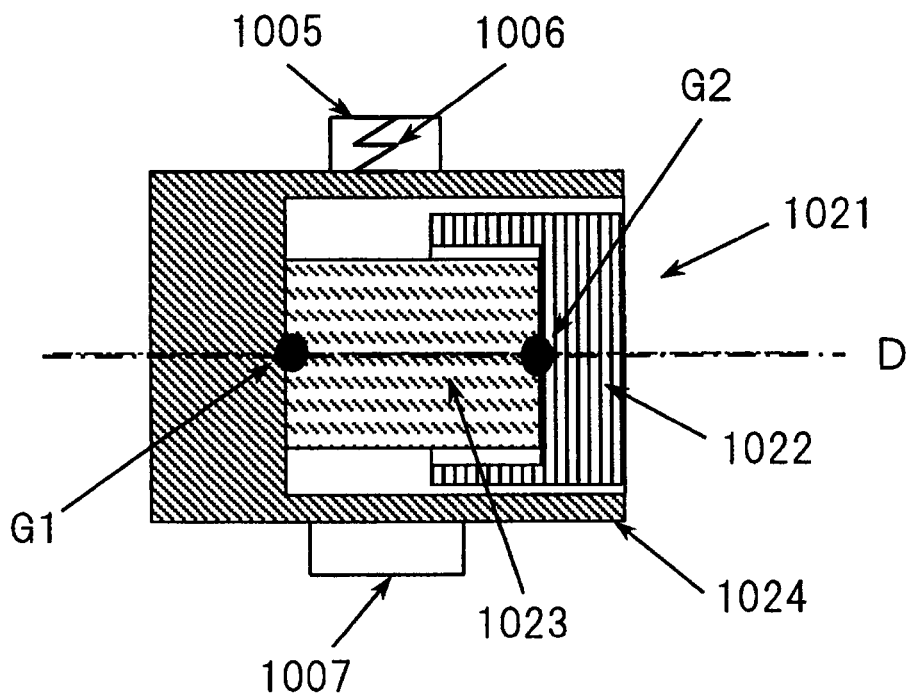
FIG. 7B is a cross-sectional view showing a primary part of a modification example of the actuator device.

Alternatively, as shown in FIG. 7B, it is also possible to allow the bottom face part of the drive shaft 1024 to be thick and so that the center of gravity G1 of the drive shaft 1024 is positioned in the vicinity of the contact end face between the drive shaft 1024 and the piezoelectric element 1023. By disposing the centers of gravity G1 and G2 at the respective end faces of the piezoelectric element 1023, almost no moment is produced and the shear stress at the adhesive-bonded surface can be reduced even when an impact force is applied to the actuator device 1021 from outside. As a result, even when a great impact force is applied to the actuator device 1021, a fracture can be prevented from occurring at the end part between the drive shaft 1024 and the piezoelectric element, or at the end part between the weight 1022 and the piezoelectric element 1023, and the impact resistance performance of the device can be enhanced.

Seventh Embodiment

Figure 8:
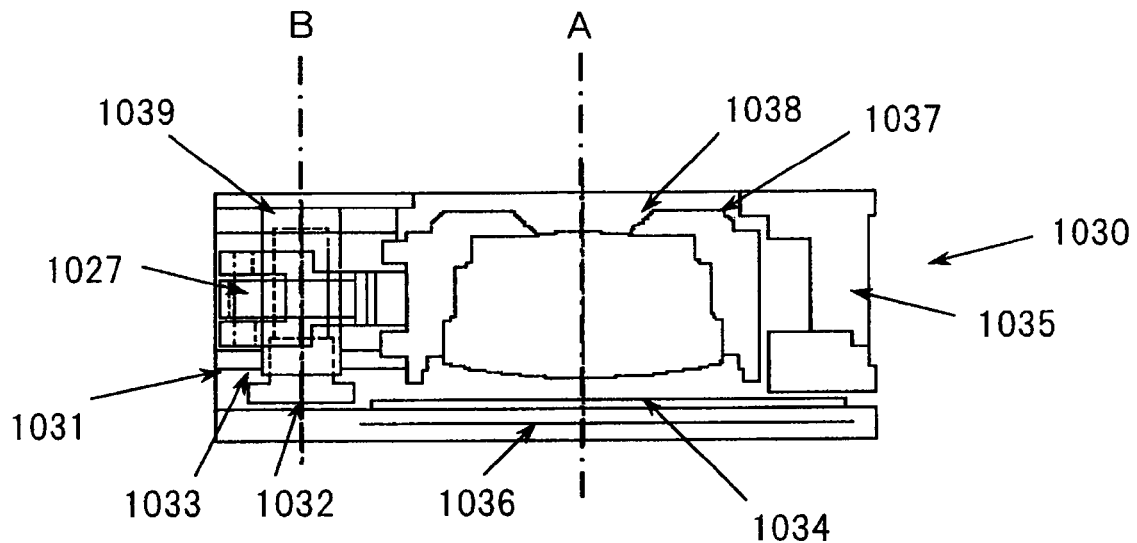
FIG. 8 is a cross-sectional view showing a primary part of an image pickup unit 1030 according to a seventh embodiment.

An image pickup unit 1030 according to the seventh embodiment will be described. FIG. 8 is a cross-sectional view showing a primary part of the image pickup unit 1030 according to the seventh embodiment. In the following description, the same parts as the parts described above are designated by the same reference numerals, and the explanations thereof are omitted.

As illustrated in FIG. 8, the image pickup unit 1030 has an aspherical lens 1038, an optical filter 1034, and a semiconductor image pickup element 1036, which are disposed along the optical axis in a housing 1035. The lens 1038 is retained by a lens-barrel 1037, and an engaging member 1027 that engages with a drive shaft 1039 of an actuator device 1031 is provided in a portion of the lens-barrel 1037.

The lens-barrel 1037 is allowed to be movable by the actuator device 1031, in which the drive shaft 1039 is disposed parallel to the optical axis. The lens 1038 is a lens having an aspheric shape (hereinafter referred to as a "lens"). Although only one lens is shown for brevity, the lens actually comprises two lenses. In order to focus a subject image precisely on the image pickup plane (not shown) of the image pickup element 1036 with respect to the distance to the subject, the device has what is called an auto-focusing function, by which the lens-barrel 1037 is moved along the optical axis direction.

As for the method for the auto-focusing, a known method is used, in which reading-out of an image is performed and the point at which the harmonic content of the read-out signal becomes the greatest.

For the actuator device 1031, the actuator device according to the fifth or the sixth embodiment is used, and its operation is the same as described in the foregoing. Thus, this image pickup unit is an image pickup unit that adjusts what is called a back focus position from the lens 1038 to the image plane by the actuator device 1031.

The optical filter 1034 is of a reflective type in which dielectric films having different refractive indices are stacked, which restricts transmission of the light other than the visible light region. The semiconductor image pickup element 1036 is a CCD having about 130 million pixels and a ¼-inch diagonal screen, and its pixel size is about 2.8 [μm].

The image pickup unit 1030 according to the seventh embodiment, which is configured in this way, employs the actuator device 1031 according to the fifth or the sixth embodiment, and the actuator device 1031 is configured so that the drive shaft 1039, the piezoelectric element 1033, and the weight 1032 have an overlap with respect to the axis direction of the drive shaft 1039. Therefore, the overall length is shortened.

As a result, even with the configuration in which the actuator device is arranged parallel to the optical axis, the thickness of the overall image pickup unit can be reduced. In addition, it will be clear that the overall length can be reduced even in the case where the actuator device 1031 protrudes from the image pickup unit 1030. In such an image pickup unit, it is advantageous to dispose the actuator device, which moves the optical system in optical axis directions when performing auto-focusing, parallel to the optical axis directions, in terms of efficiency and in terms of shape. However, it is also possible to dispose the actuator device perpendicular to the optical axis to apply an image pickup unit provided with a conversion mechanism by a cam or the like.

In addition, when the aspherical lens 1038 disposed along the optical axis comprises a plurality of lens groups, it is also possible to change the relationship of the optical axis direction of the lens group and the relationship with the image pickup element 1036. In this case, it becomes possible to change the imaging magnification on the image plane. An image pickup unit employing what is called a zoom lens can be realized.

When the aspherical lens 1038 comprises a plurality of lens group, a plurality of actuator devices is necessary since the movement is necessary for each lens group. Consequently, the axial size of the device becomes larger, and the thickness reduction becomes difficult. However, according to this embodiment, which uses an actuator device 1031, thickness reduction can be achieved by, for example, increasing the overlap of the piezoelectric element and the weight along the optical axis directions for the actuator device for, of the lens groups, a lens having a moving distance longer than the others. It will be clear to those skilled in the art that the sizes and shapes thereof can be changed as appropriate.

Eighth Embodiment

Figure 9:
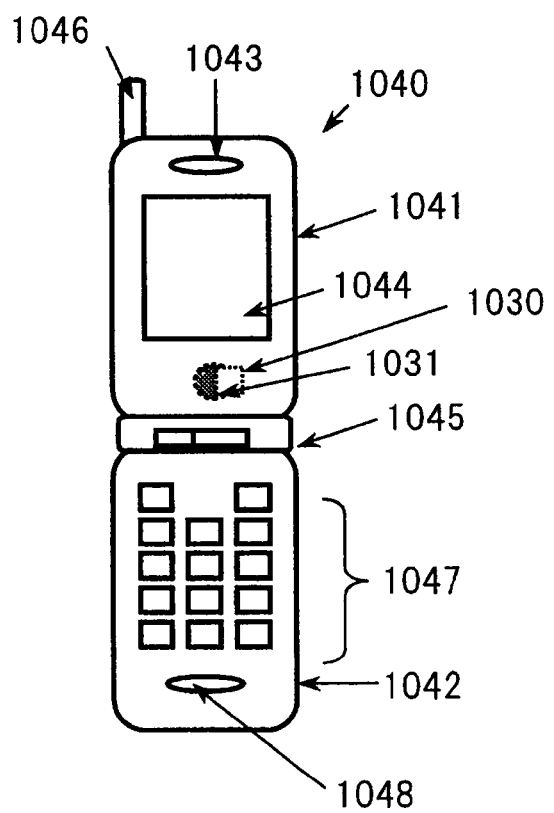
FIG. 9 is a front view of a mobile terminal apparatus 1040 according to an eighth embodiment.
Figure 10A:
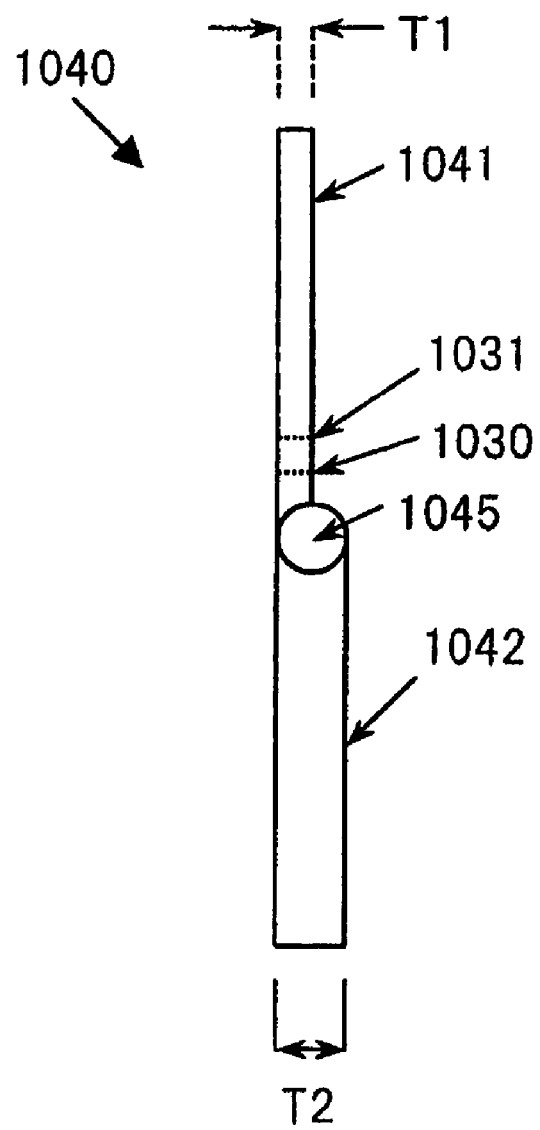
FIG. 10A is a side view of a mobile terminal apparatus 1040 according to the eighth embodiment.
Figure 10B:
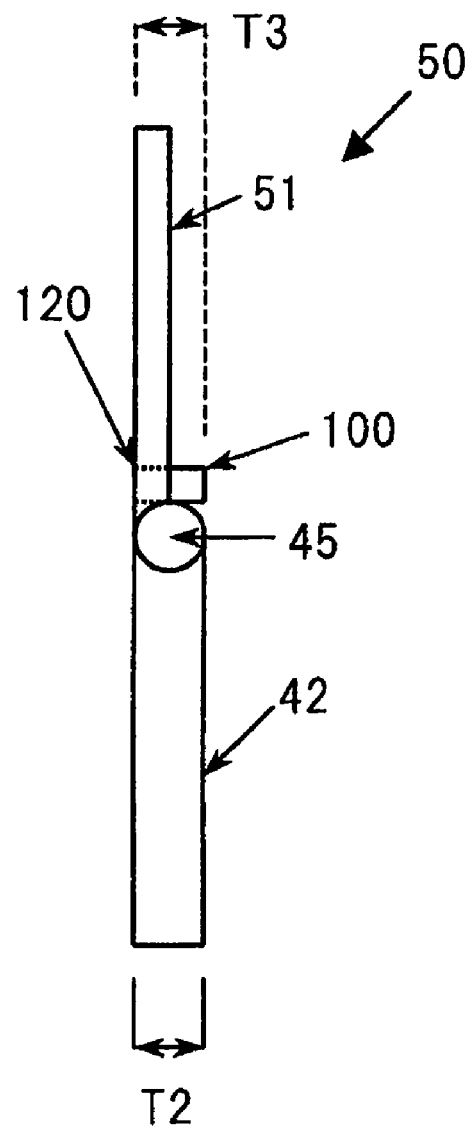
FIG. 10B is a side view of a conventional mobile terminal apparatus 1050.

A mobile terminal apparatus 1040 according to the eighth embodiment will be described. FIG. 9 is a front view of the mobile terminal apparatus 1040 according to the eighth embodiment. FIG. 10A is a side view of the mobile terminal apparatus 1040 according to the eighth embodiment. FIG. 10B is a side view of a conventional mobile terminal apparatus 1050.

In the following description, the same parts as the parts described above are designated by the same reference numerals, and the explanations thereof are omitted.

As illustrated in FIG. 9, the mobile terminal apparatus 1040 according to the eighth embodiment is a foldable-type mobile telephone. The mobile terminal apparatus 1040 is configured so that an upper housing 1041 and a lower housing 1042 can be folded on top of each other via a hinge 1045. The upper housing 1041 comprises a liquid crystal display screen 1044, a speaker 1043, an antenna 1046 for performing transmission and reception, an image pickup unit 1030, and so forth. The lower housing 1042 comprises input keys 1047, a microphone 1048, and so forth.

The image pickup unit 1030 employs an image pickup unit according to the above-described seventh embodiment, which is equipped with an auto-focusing function. An actuator device 1031 is disposed in a portion of the image pickup unit 1030. The image pickup direction of the image pickup unit 1030 is perpendicular to a plane that contains the display screen 1044 in FIG. 9; in other words, the optical axis is the facing direction in the figure. The moving direction of the optical system by the auto-focusing is also in the facing direction.

The mobile terminal apparatus 1040 has a configuration in which the upper housing 1041 and the lower housing 1042 are open when in use and are folded when not in use.

The mobile terminal apparatus 1040 incorporates the image pickup unit 1030 shown in the seventh embodiment, as mentioned above, and achieves improvements in thickness reduction. In the case of clamshell mobile terminal, the image pickup unit incorporated in the upper housing dominantly determines the thickness of the upper housing. As shown in FIG. 10A, the thickness of the upper housing 1041 of the mobile terminal apparatus 1040 according to the eighth embodiment is T1. On the other hand, the conventional mobile terminal apparatus 50 incorporates the image pickup unit 120 having the conventional actuator device 100, and therefore, the thickness of the upper housing 51 is T3, as shown in FIG. 10B.

Thus, the thicknesses are T1 and T3, respectively, due to the difference in thickness with respect to the optical axis direction of the actuator device 1041 of the image pickup unit 1030, and the relationship T1<T3 holds. In addition, even when the image pickup unit does not determine the thickness of the upper housing dominantly, a plenty of room in terms of the thickness direction can be provided within the upper housing 1041. Therefore, it becomes possible to improve the degree of freedom in designing, such as arrangement of other components and addition of other components.

Furthermore, improvements in impact resistance value against dropping, for example, have been required for mobile telephones. By using the image pickup unit 1030 according to the seventh embodiment, the center of gravity of the weight of the actuator device 1031 is positioned near the end face of the piezoelectric element in which the piezoelectric element is adhesive-bonded. Therefore, fractures do not easily occur even with an impact force that is greater than conventionally applied. In other words, the moment due to an impact force or the like is reduced against the drop impact to the mobile terminal apparatus, and the impact moment is reduced. Therefore, the impact resistance performance can be improved, and reliability is enhanced.

The actuator devices and image pickup unit in the embodiments are not limited to these configurations, and are applicable to various types of mobile information devices. For example, it will be clear that the applications also include such mobile information devices as PDAs (Personal Digital Assistants), personal computers, and external devices for personal computers.

Ninth Embodiment

Figure 11:
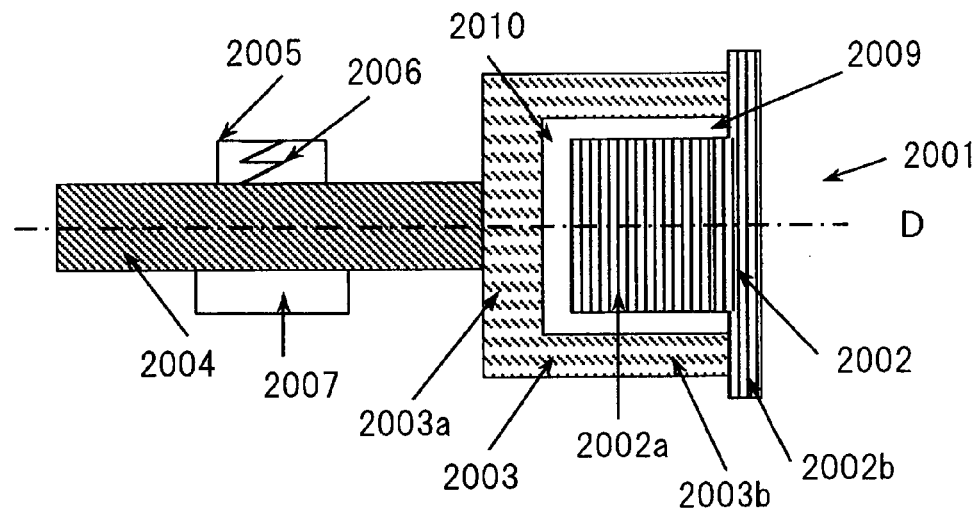
FIG. 11 is a cross-sectional view showing a primary part of an actuator device 2001 according to a ninth embodiment.

Hereinbelow, an actuator device according to this embodiment of the invention will be described with reference to the drawings. FIG. 11 is a cross-sectional view of a primary part of an actuator device 2001 illustrating the ninth embodiment of the invention.

An actuator device 2001 of the ninth embodiment shown in FIG. 11 has a piezoelectric element 2003, a weight 2002 provided on one end side of the piezoelectric element 2003, and a drive shaft 2004 provided on the other end side of the piezoelectric element 2003, each of which is adhesive-bonded by adhesive (not shown).

The piezoelectric element 2003 is constructed, for example, by stacking (piling up) piezoelectric elements of lead zirconate titanate (hereinafter "PZT"). The piezoelectric element 2003 of the ninth embodiment comprises a portion 2003a and a centrally hollow portion 2003b that are constructed integrally. In the portion 3a, disk-shaped PZTs are stacked, and in the portion 3b, donut-shaped PZTs are stacked. In other words, the piezoelectric element 2003 is in a shape that has a cylindrical space 2009 with a certain depth.

The weight 2002 provided on one end side of the piezoelectric element 2003 is formed of a metal having a high density, such as tungsten, and formed in a stepped shape. A portion thereof with a smaller diameter is formed into a shape that can be inserted correspondingly in the space 2009. The weight 2002 is adhesive-bonded to the piezoelectric element 2003 at a stepped part 2002b having a larger diameter. In this case, it is necessary that a gap 2010 is provided between the piezoelectric element 2003 and the tip portion of the smaller diameter portion 2002a of the weight 2002.

This is to allow the weight 2002 to be the one that is disposed on an end part of the piezoelectric element 2003, and thereby, the weight 2002 is made equivalent to the one in which a weight 2 is mechanically folded over. In addition, the piezoelectric element 2003 and the weight 2002 are disposed so as to be coaxial with each other. Specifically, for example, the stepped part 2002b of the weight 2002 was formed so that the diameter was Φ 3.5 [mm] and the length was 0.48 [mm], and the smaller diameter portion 2002a was formed so that the diameter was Φ 1.8 [mm] and the length was 0.98 [mm]. The piezoelectric element 2003 was formed so as to have an outer diameter of Φ 3.2 [mm] and a length of 1.5 [mm], and the space 2009 was formed so as to have Φ 2 [mm] and a length of 1.0 [mm]

The drive shaft 2004 was formed of long carbon fibers having a diameter of Φ 1.0 [mm] and a length of 4.0 [mm] that were aligned in an axis direction and fixed by an epoxy resin as a binder to improve abrasion resistance.

With this configuration, the center of gravity G of the weight 2002 is positioned in the vicinity of the intersection point of the coaxial axis D and a contact plane in which the piezoelectric element 2003 and the weight 2002 are adhesive-bonded, as illustrated in FIG. 11.

The drive shaft 2004 is provided with an engaging member such as to catch and hold the shaft from both sides of the shaft. Here, the engaging member comprises a slider 2007, a holder 2005, and a spring 2006 as an urging means for causing the slider 2007 and the holder 2005 to friction-engage with the drive shaft.

Next, the operation of the actuator device 2001 will be discussed. A drive voltage such as a sawtooth wave is applied to the piezoelectric element 2003 to this actuator device 2001 by a drive circuit comprising an H-bridge, which is not shown. As the drive voltage is increased, the piezoelectric element 2003 is deformed in the expansion direction in FIG. 11 (toward the left in the figure). As the drive voltage is raised gradually, the piezoelectric element 2003 extends slowly, and accordingly, the drive shaft 2004 is slowly displaced toward the left.

The drive shaft 2004 and the engaging member are displaced by static friction while they are kept engaged with each other in the same positional relationship. That is, as the voltage is raised gradually, the engaging member is displaced toward the left of the figure.

Next, when the drive voltage is abruptly changed in the opposite direction, the piezoelectric element 2003 contracts abruptly, and accordingly, the drive shaft 2004 is rapidly displaced toward the right. At this time, the engaging member overcomes the friction with the drive shaft 2004 and stays unmoved at that place (according to the law of inertia). As a result, the engaging member moves toward the left relative to the drive shaft 2004. By repeating this, the engaging part can be moved continuously.

Changing the moving direction can be realized by making the voltage application opposite or reversing the drive waveform. In the present embodiment, the drive circuit is an H-bridge as described above. This is convenient since the polarity of the applied voltage can be easily reversed. Although it is possible to change the voltage waveform, application method, and time interval of the applied voltage in many ways, it is important that they should be optimized from various characteristics such as efficiency, moving speed, and noise, depending on the actual system.

In this way, the actuator device 2001 according to the ninth embodiment allows the engaging member to move. Furthermore, since the piezoelectric element 2003 and the weight 2002 are disposed so as to be coaxial with each other, it is possible to reduce unnecessary moment produced in the weight 2002 due to expansion and contraction of the piezoelectric element 2003. Thus, vibration and noise can be prevented from occurring.

What is more, the actuator device 2001 of the ninth embodiment makes it possible to reduce the total longitudinal size of the piezoelectric element 2003 and the weight 2002, since the smaller diameter portion of the weight 2002 has such a shape as to be inserted into the space 2009 of the piezoelectric element 2003 correspondingly, although the drive shaft 2004 has the same shape. Specifically, the total longitudinal size of the piezoelectric element 2003 and the weight 2002 was reduced from 3 [mm] to about 2 [mm], which was a 1 [mm] reduction. As a result, the overall actuator device 2001 can be made smaller, and the image pickup unit that employs the actuator device 2001 can also be made smaller and thinner.

Although specific dimensions may be changed as appropriate by changing the shapes of the piezoelectric element and the weight, it is desirable that the volumes of the piezoelectric element and the weight should be nearly invariable before and after the change.

Tenth Embodiment

Figure 12A:
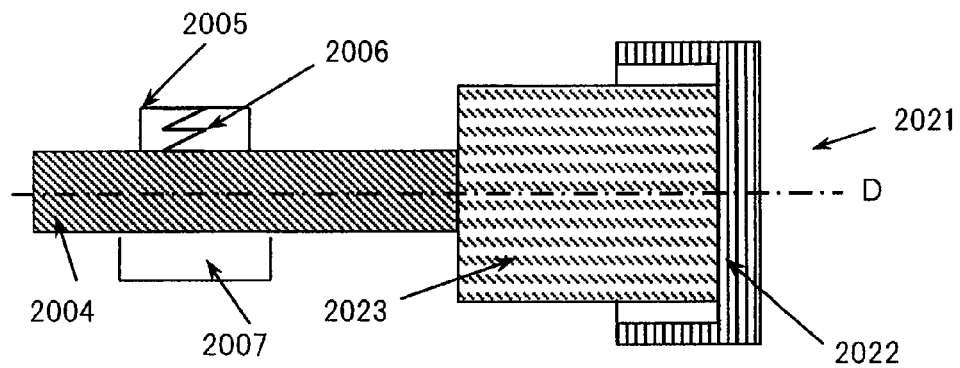
FIG. 12A is a cross-sectional view showing a primary part of an actuator device 2021 according to a tenth embodiment.

FIG. 12A is a cross-sectional view of a primary part of an actuator device 2021, which illustrates the tenth embodiment of the invention.

In the following description, the same parts as the parts described above are designated by the same reference numerals, and the explanations thereof are omitted.

An actuator device 2021 according to the tenth embodiment of the invention will be described. A piezoelectric element 2023 of the tenth embodiment has a cylindrical shape, which is similar to the conventional examples. On the other hand, a weight 2022 is provided with a cylindrical space in its center part, and it is formed so that the piezoelectric element 2023 can be accommodated therein. In addition, the piezoelectric element 2023 and the weight 2022 are adhesive-bonded together at a bottom face part of the cylindrical shape of the weight 2022.

With this configuration, the actuator device is formed so that the piezoelectric element 2023 can be accommodated in the cylindrical space provided at the center part of the weight 2022; therefore, the total longitudinal size of the piezoelectric element 2022 and the weight 2021 can be shortened, and the overall actuator device 1021 can also be made smaller.

Moreover, although the actuator device 2021 according to the tenth embodiment necessitates a slightly more complicated shape of the weight than that of the actuator device 2001 according to the ninth embodiment, the fabrication of the weight can be performed with almost no change in the degree of difficulty associated with the processing since the fabrication of the weight is generally done by die-cast or machining with a lathe. Therefore, the fabrication of the piezoelectric element is made more easily than with the ninth embodiment, in which two kinds of piezoelectric elements need to be prepared and stacked.

Furthermore, according to the configuration of the actuator device 2021 of the tenth embodiment, the weight 2022 covers an outside shape of the piezoelectric element 2023, making it possible to protect the piezoelectric element. That is, this embodiment has an advantage that the piezoelectric element 2023 can be prevented from being damaged, for example, during handling.

Figure 12B:
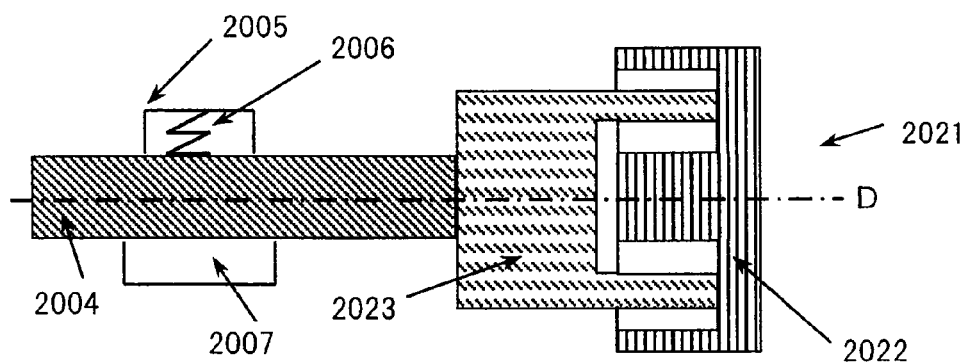
FIG. 12B is a cross-sectional view showing a primary part of a modification example of the actuator device.

Furthermore, as illustrated in FIG. 12B, it is also possible to use the ninth and the tenth embodiments in combination. It is also possible to employ a configuration in which a protruding part is provided inside a recessed part provided in the weight 2022 so as not to be in contact with the piezoelectric element 2023. This enhances the degree of freedom in designing. Moreover, the shape of the weight can be made relatively large; therefore, it is possible to replace the costly materials such as tungsten with less-costly materials, such as brass.

Eleventh Embodiment

Figure 13:
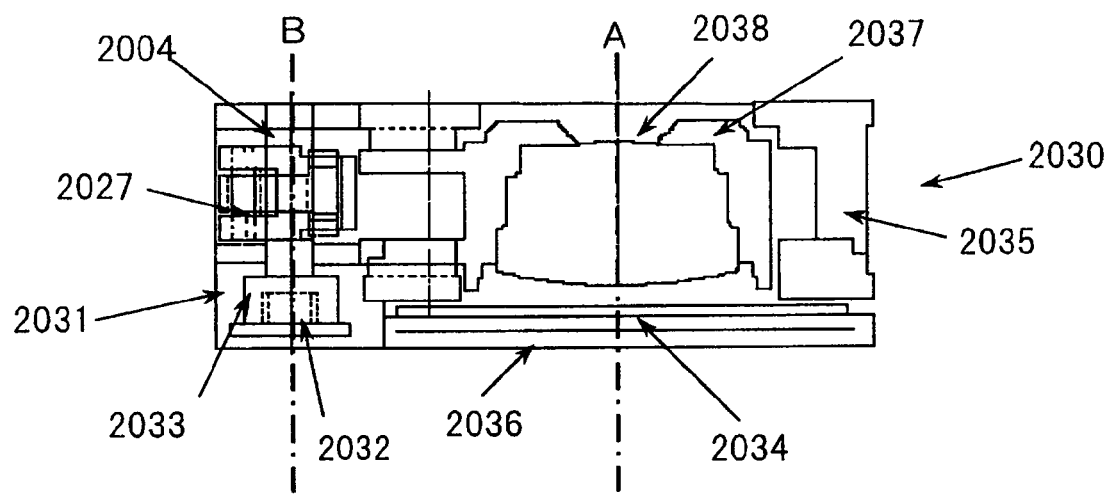
FIG. 13 is a cross-sectional view showing a primary part of an image pickup unit 2030 according to an eleventh embodiment.

An image pickup unit 2030 according to the eleventh embodiment will be described. FIG. 13 is a cross-sectional view showing a primary part of the image pickup unit 2030 according to the eleventh embodiment. In the following description, the same parts as the parts described above are designated by the same reference numerals, and the explanations thereof are omitted.

As illustrated in FIG. 13, the image pickup unit 2030 has an aspherical lens 2038, an optical filter 2034, and a semiconductor image pickup element 2036, which are disposed along the optical axis in a housing 2035. The lens 2038 is retained by a lens-barrel 2037, and an engaging member 2027 that engages with a drive shaft 2004 of an actuator device 2031 is provided in a portion of the lens-barrel 2037.

The lens-barrel 2037 is allowed to be movable by the actuator device 2031, in which the drive shaft 2004 is disposed parallel to the optical axis. The lens 2038 is a lens having an aspheric shape (hereinafter referred to as a "lens"). Although only one lens is shown for brevity, the lens actually comprises two or more lenses. In order to focus a subject image precisely on the image pickup plane (not shown) of the image pickup element 2036 with respect to the distance to the subject, the device has what is called an auto-focusing function, by which the lens-barrel 2037 is moved along the optical axis direction.

As for the method for the auto-focusing, a known method is used, in which reading-out of an image is performed and the point at which the harmonic content of the read-out signal becomes the greatest.

For the actuator device 2031, the actuator device according to the ninth or the tenth embodiment is used, and its operation is the same as described in the foregoing. Thus, this image pickup unit is an image pickup unit that adjusts what is called a back focus position from the lens 2038 to the image plane by the actuator device 2031.

The optical filter 2034 is of a reflective type in which dielectric films having different refractive indices are stacked, which restricts transmission of the light other than the visible light region. The semiconductor image pickup element 2036 is, for example, a CCD having about 130 million pixels and a ¼-inch diagonal screen, and its pixel size is about 2.8 [μm].

The image pickup unit 2030 according to the eleventh embodiment that is configured in this way employs the actuator device 2031 according to the ninth or the tenth embodiment, and the actuator device 2031 is configured so that the piezoelectric element 2033 and the weight 2032 have an overlap with respect to the axis direction of the drive shaft 2004. Therefore, the overall length is shortened although the same drive shaft 2004 is used.

As a result, even with the configuration in which the actuator device is arranged parallel to the optical axis, the thickness of the overall image pickup unit can be reduced. In addition, it will be clear that the overall length can be reduced even in the case where the actuator device 2031 protrudes from the image pickup unit 2030. In such an image pickup unit, it is advantageous to dispose the actuator device, which moves the optical system in optical axis directions when performing auto-focusing, parallel to the optical axis directions, in terms of efficiency and in terms of shape. However, it is also possible to dispose the actuator device perpendicular to the optical axis to apply an image pickup unit provided with a conversion mechanism by a cam or the like.

In addition, when the aspherical lens 2038 disposed along the optical axis comprises a plurality of lens groups, it is also possible to change the relationship of the optical axis direction of the lens group and the relationship with the image pickup element 2036. In this case, it becomes possible to change the imaging magnification on the image plane. An image pickup unit employing what is called a zoom lens can be realized.

When the aspherical lens 2038 comprises a plurality of lens group, a plurality of actuator devices is necessary since the movement is necessary for each lens group. Consequently, the axial size of the device becomes larger, and the thickness reduction becomes difficult. However, according to this embodiment, which uses an actuator device 2031, thickness reduction can be achieved by, for example, increasing the overlap of the piezoelectric element and the weight along the optical axis directions for the actuator device for, of the lens groups, a lens having a moving distance longer than the others. It will be clear to those skilled in the art that the sizes and shapes thereof can be changed as appropriate.

Twelfth Embodiment

Figure 14:
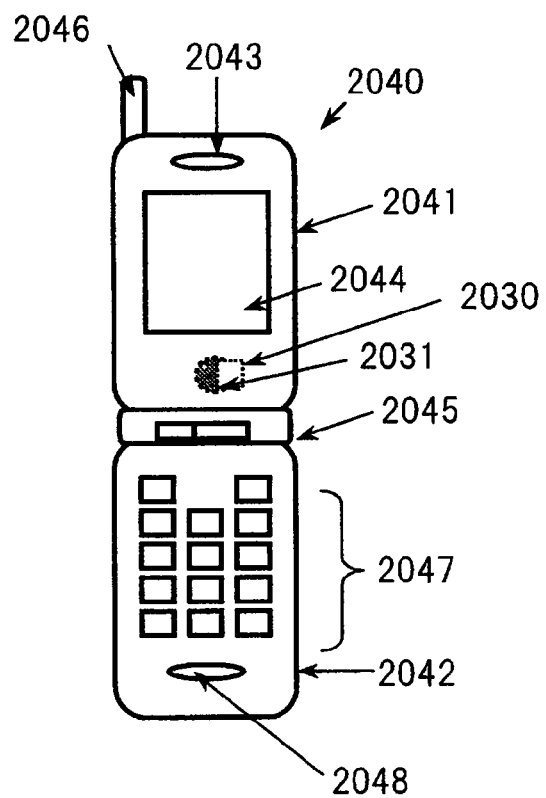
FIG. 14 is a front view of a mobile terminal apparatus 2040 according to a twelfth embodiment.
Figure 16:
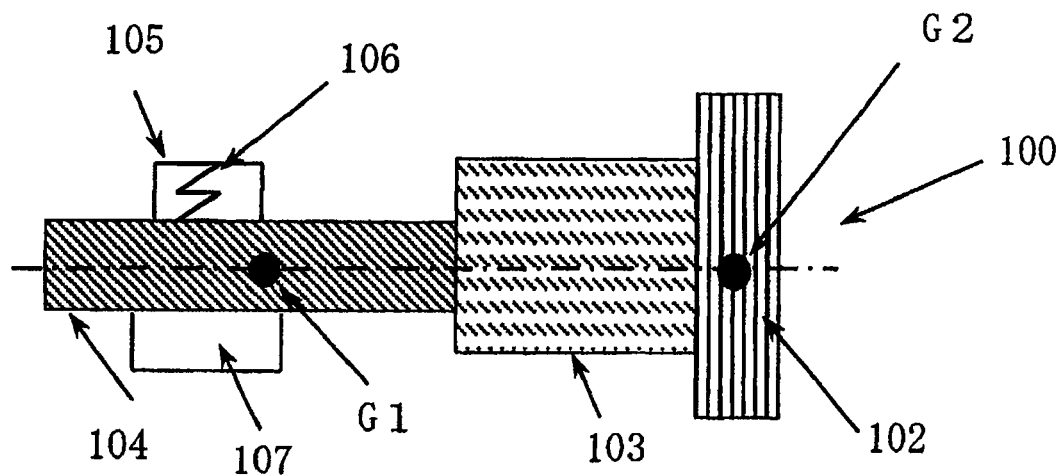
FIG. 16 is a schematic structural view of an actuator device using a conventional piezoelectric element.
Figure 17:
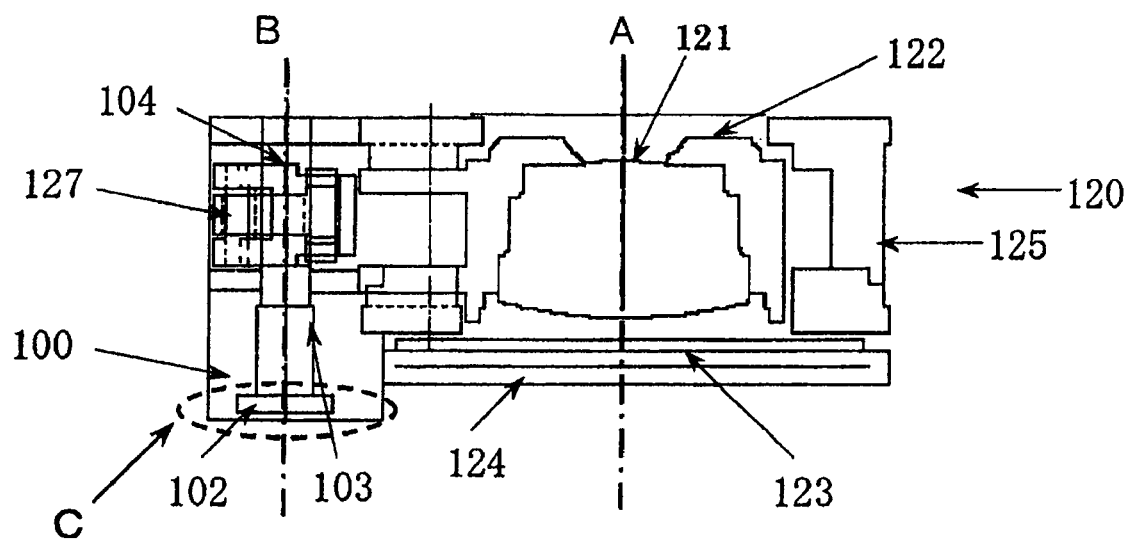
FIG. 17 is a schematic structural view of an image pickup unit incorporating a conventional actuator device.

A mobile terminal apparatus 2040 according to the twelfth embodiment will be described. FIG. 14 is a front view of the mobile terminal apparatus 2040 according to the twelfth embodiment. FIG. 15A is a side view of the mobile terminal apparatus 2040 according to the twelfth embodiment. FIG. 15B is a side view of a conventional mobile terminal apparatus 2050.

In the following description, the same parts as the parts described above are designated by the same reference numerals, and the explanations thereof are omitted.

As illustrated in FIG. 14, the mobile terminal apparatus 2040 according to the twelfth embodiment is a foldable-type mobile telephone. The mobile terminal apparatus 2040 is configured so that an upper housing 2041 and a lower housing 2042 can be folded on top of each other via a hinge 2045. The upper housing 2041 comprises a liquid crystal display screen 2044, a speaker 2043, an antenna 2046 for performing transmission and reception, an image pickup unit 2030, and so forth. The lower housing 2042 comprises input keys 2047, a microphone 2048, and so forth.

The image pickup unit 2030 employs an image pickup unit according to the above-described eleventh embodiment, which is equipped with an auto-focusing function. An actuator device 2031 is disposed in a portion of the image pickup unit 2030. The image pickup direction of the image pickup unit 2030 is perpendicular to a plane that contains the display screen 2044 in FIG. 14; in other words, the optical axis is the facing direction in the figure. The moving direction of the optical system by the auto-focusing is also in the facing direction.

The mobile terminal apparatus 2040 has a configuration in which the upper housing 2041 and the lower housing 2042 are open when in use and are folded when not in use.

The mobile terminal apparatus 2040 incorporates the image pickup unit 2030 shown in the eleventh embodiment, as mentioned above, and achieves improvements in thickness reduction. In the case of clamshell mobile terminal, the image pickup unit incorporated in the upper housing dominantly determines the thickness of the upper housing. As shown in FIG. 15A, the thickness of the upper housing 2041 of the mobile terminal apparatus 2040 according to the twelfth embodiment is T1. On the other hand, the conventional mobile terminal apparatus 50 incorporates the image pickup unit 120 having the conventional actuator device 100, and therefore, the thickness of the upper housing 51 is T3, as shown in FIG. 15B.

Thus, the thicknesses are T1 and T3, respectively, due to the difference in thickness with respect to the optical axis direction of the actuator device 2041 of the image pickup unit 2030, and the relationship T1<T3 holds. In addition, even when the image pickup unit does not determine the thickness of the upper housing dominantly, a plenty of room in terms of the thickness direction can be provided within the upper housing 2041. Therefore, it becomes possible to improve the degree of freedom in designing, such as arrangement of other components and addition of other components.

The actuator devices and image pickup unit in the embodiments are not limited to these configurations, and are applicable to various types of mobile information devices. For example, it will be clear that the applications also include such mobile information devices as PDAs (Personal Digital Assistants), personal computers, and external devices for personal computers.

Although the invention has been shown and described in detail with reference to specific embodiments thereof, it will be apparent to those skilled in the art that various changes and modifications may be made herein without departing from the scope and sprit of the invention.

This application claims priority from Japanese Patent Application No. 2006-107653, filed on Apr. 10, 2006, Japanese Patent Application No. 2006-107654, filed on Apr. 10, 2006, and Japanese Patent Application No. 2006-125042, filed on Apr. 28, 2006, which are incorporated herein by reference.

INDUSTRIAL APPLICABILITY

The actuator device of the invention may be applied to cameras, mobile telephones, and PDAs (Personal Digital Assistants), as well as personal computers and mobile information devices such as external devices for personal computers. The actuator device of the invention is useful as an actuator device that can improve the impact resistance performance of the device or apparatus that employs the actuator device and moreover can reduce the size and thickness of the device or apparatus.

The invention claimed is:

1. An actuator device comprising:
   a piezoelectric element;
   a weight secured to one end of the piezoelectric element along an expansion-contraction direction thereof; and
   a drive member secured to another end of the piezoelectric element along the expansion-contraction direction, wherein:
   the piezoelectric element and the weight are in contact so that the piezoelectric element has a spatial overlap, with respect to the expansion-contraction direction, with the weight, and
   the center of gravity of the weight is positioned in the vicinity of a plane that contains a contact plane in which the piezoelectric element and the weight are in contact.

2. An actuator device comprising:
   a piezoelectric element having a recessed part;
   a weight having a flat part secured to one end of the piezoelectric element along an expansion-contraction direction thereof, and a protruding part accommodated in the recessed part of the piezoelectric element; and
   a drive member secured to another end of the piezoelectric element along the expansion-contraction direction, wherein
   the center of gravity of the weight is positioned in the vicinity of a plane that contains a contact plane in which the piezoelectric element and the weight are in contact.

3. An actuator device comprising:
   a piezoelectric element;
   a weight having a recessed part for accommodating a portion of the piezoelectric element, the weight secured to one end of the piezoelectric element along an expansion-contraction direction thereof at a bottom face of the recessed part; and
   a drive member secured to another end of the piezoelectric element along the expansion-contraction direction, wherein
   the center of gravity of the weight is positioned in the vicinity of a plane that contains a contact plane in which the piezoelectric element and the weight are in contact.

4. The actuator device as set forth in claim 1, wherein the piezoelectric element and the weight are disposed substantially coaxially with each other.

5. An image pickup unit comprising:
   an actuator device comprising: a piezoelectric element; a weight secured to one end of the piezoelectric element along an expansion-contraction direction thereof; and a drive member secured to another end of the piezoelectric element along the expansion-contraction direction, wherein the piezoelectric element and the weight are in contact so that the piezoelectric element has a spatial overlap, with respect to the expansion-contraction direction, with the weight, and the center of gravity of the weight is positioned in the vicinity of a plane that contains a contact plane in which the piezoelectric element and the weight are in contact;

an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

6. The image pickup unit as set forth in claim 5, wherein an imaging magnification of the image pickup element for the image pickup plane is varied by movement of the lens-barrel for retaining the lens in an optical axis direction.

7. A mobile terminal apparatus comprising an image pickup unit as set forth in claim 5.

8. An actuator device comprising:
a piezoelectric element;
a weight secured to one end of the piezoelectric element along an expansion-contraction direction thereof; and
a drive member secured to another end of the piezoelectric element along the expansion-contraction direction, wherein
the drive member and the piezoelectric element are in contact so that the drive member has a spatial overlap, with respect to the expansion-contraction direction, with the piezoelectric element and the weight.

9. An actuator device comprising:
a piezoelectric element;
a weight secured to one end of the piezoelectric element along an expansion-contraction direction thereof; and
a drive member secured to another end of the piezoelectric element along the expansion-contraction direction, wherein
the drive member has a recessed part for accommodating at least a portion of the piezoelectric element and the weight, with respect to the expansion-contraction direction.

10. The actuator device as set forth in claim 8, wherein the center of gravity of the drive member is positioned in the vicinity of a plane that contains a contact plane in which the piezoelectric element and the weight are in contact.

11. The actuator device as set forth in claim 8, wherein the piezoelectric element and the weight are in contact so as to have the spatial overlap with respect to the expansion-contraction direction.

12. The actuator device as set forth in claim 8, wherein the weight has a recessed part for accommodating at least a portion of the piezoelectric element with respect to the expansion-contraction direction of the piezoelectric element.

13. The actuator device as set forth in claim 11, wherein the center of gravity of the weight is positioned in the vicinity of a plane that contains a contact plane in which the piezoelectric element and the weight are in contact.

14. The actuator device as set forth in claim 8, wherein the drive member, the piezoelectric element, and the weight are disposed substantially coaxially with each other.

15. An image pickup unit comprising:
an actuator device comprising: a piezoelectric element; a weight secured to one end of the piezoelectric element along an expansion-contraction direction thereof; and a drive member secured to another end of the piezoelectric element along the expansion-contraction direction, wherein the drive member and the piezoelectric element are in contact so that the drive member has a spatial overlap, with respect to the expansion-contraction direction, with the piezoelectric element and the weight;

an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

16. The image pickup unit as set forth in claim 15, wherein, in the actuator device, the center of gravity of the drive member is positioned in the vicinity of a plane that contains a contact plane in which the piezoelectric element and the weight are in contact.

17. The image pickup unit as set forth in claim 15, wherein an imaging magnification of the image pickup element for the image pickup plane is varied by movement of the lens-barrel for retaining the lens in an optical axis direction.

18. A mobile terminal apparatus comprising an image pickup unit as set forth in claim 15.

19. An actuator device comprising:
a piezoelectric element;
a weight secured to one end of the piezoelectric element along an expansion-contraction direction thereof; and
a drive member secured to another end of the piezoelectric element along the expansion-contraction direction, wherein
the piezoelectric element and the weight are in contact so that the piezoelectric element has a spatial overlap, with respect to the expansion-contraction direction, with the weight.

20. An actuator device comprising:
a piezoelectric element having a recessed part;
a weight having a flat part secured to one end of the piezoelectric element along an expansion-contraction direction thereof, and a protruding part accommodated in the recessed part of the piezoelectric element; and
a drive member secured to another end of the piezoelectric element along the expansion-contraction direction.

21. An actuator device comprising:
a piezoelectric element;
a weight having a recessed part for accommodating at least a portion of the piezoelectric element, the weight secured to one end of the piezoelectric element along an expansion-contraction direction thereof at a bottom face of the recessed part; and
a drive member secured to another end of the piezoelectric element along the expansion-contraction direction.

22. The actuator device as set forth in claim 19, wherein the piezoelectric element and the weight are disposed substantially coaxially with each other.

23. An image pickup unit comprising:
an actuator device comprising: a piezoelectric element; a weight secured to one end of the piezoelectric element along an expansion-contraction direction thereof; and a drive member secured to another end of the piezoelectric element along the expansion-contraction direction, wherein the piezoelectric element and the weight are in contact so that the piezoelectric element has a spatial overlap, with respect to the expansion-contraction direction, with the weight;

an engaging member for engaging the drive member and a lens-barrel for retaining a lens; and an image pickup element for converting light from the lens into an electric signal, wherein the lens-barrel moves in an optical axis direction of the lens according to expansion and contraction of the piezoelectric element.

24. The image pickup unit as set forth in claim 23, wherein an imaging magnification of the image pickup element for the image pickup plane is varied by movement of the lens-barrel for retaining the lens in an optical axis direction.

25. A mobile terminal apparatus comprising an image pickup unit as set forth in claim 23.

26. The actuator device as set forth in claim 2, wherein the piezoelectric element and the weight are disposed substantially coaxially with each other.

27. The actuator device as set forth in claim 3, wherein the piezoelectric element and the weight are disposed substantially coaxially with each other.

28. The actuator device as set forth in claim 20, wherein the piezoelectric element and the weight are disposed substantially coaxially with each other.

29. The actuator device as set forth in claim 21, wherein the piezoelectric element and the weight are disposed substantially coaxially with each other.

* * * * *